United States Patent
Maehling et al.

(10) Patent No.: US 8,338,344 B2
(45) Date of Patent: Dec. 25, 2012

(54) COLD FLOW IMPROVER

(75) Inventors: Frank-Olaf Maehling, Mannheim (DE); Thomas Pfeiffer, Boehl-Iggelheim (DE); Uwe Rebholz, Mehlingen (DE); Irene Troetsch-Schaller, Bissersheim (DE); Thomas Zelinski, Neuleiningen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 298 days.

(21) Appl. No.: 12/515,371

(22) PCT Filed: Nov. 16, 2007

(86) PCT No.: PCT/EP2007/062465
§ 371 (c)(1),
(2), (4) Date: May 18, 2009

(87) PCT Pub. No.: WO2008/059055
PCT Pub. Date: May 22, 2008

(65) Prior Publication Data
US 2010/0048439 A1    Feb. 25, 2010

(30) Foreign Application Priority Data
Nov. 17, 2006 (EP) ................................ 06124356

(51) Int. Cl.
*C10L 1/18*   (2006.01)
*C10M 145/16*   (2006.01)
*C10M 145/14*   (2006.01)

(52) U.S. Cl. ............................. 508/469; 508/467; 44/388
(58) Field of Classification Search .................. 508/469, 508/467; 44/388
See application file for complete search history.

(56) References Cited

U.S. PATENT DOCUMENTS

| 3,048,479 | A |   | 8/1962  | Iinyckyj et al. |
| 3,627,838 | A |   | 12/1971 | Ilnyckyj et al. |
| 3,642,459 | A |   | 2/1972  | Ilnyckyj |
| 3,961,961 | A |   | 6/1976  | Rich |
| 4,155,719 | A |   | 5/1979  | Sweeney |
| 4,211,534 | A | * | 7/1980  | Feldman .......................... 44/394 |
| 4,932,980 | A |   | 6/1990  | Mueller et al. |
| 5,939,365 | A | * | 8/1999  | Redpath et al. ............... 508/467 |
| 6,821,933 | B2 | * | 11/2004 | Feustel et al. .................. 508/390 |
| 2006/0137242 | A1 | | 6/2006 | Siggelkow et al. |
| 2008/0178523 | A1 | | 7/2008 | Ahlers et al. |

FOREIGN PATENT DOCUMENTS

| DE | 1 902 925  | 11/1969 |
| DE | 25 15 805  | 10/1975 |
| DE | 31 41 507  | 4/1983  |
| DE | 37 25 059  | 2/1989  |
| EP | 0 261 957  | 3/1988  |
| EP | 0 721 492  | 7/1996  |
| EP | 1 674 554  | 6/2006  |
| WO | 2005 054314 | 6/2005 |
| WO | 2006 111326 | 10/2006 |

* cited by examiner

*Primary Examiner* — Walter D Griffin
*Assistant Examiner* — Francis C Campanell
(74) *Attorney, Agent, or Firm* — Oblon, Spivak, McClelland, Maier & Neustadt, L.L.P.

(57) ABSTRACT

The invention relates to the use of polymers which comprise, in copolymerized form, an α-olefin, at least one alkenyl ester and at least one ester of an α,β-unsaturated carboxylic acid with higher alcohols as an additive for fuel oils and lubricants and especially as a cold flow improver in fuel oils; to the fuel oils and lubricants additized with these polymers; and to additive packages comprising such copolymers. The invention also relates to quaternary and higher copolymers which comprise the abovementioned monomers in copolymerized form.

40 Claims, No Drawings

COLD FLOW IMPROVER

The invention relates to the use of polymers which comprise, in copolymerized form, an α-olefin, at least one alkenyl ester and at least one ester of an α,β-unsaturated carboxylic acid with higher alcohols as an additive for fuel oils and lubricants and especially as a cold flow improver in fuel oils; to the fuel oils and lubricants additized with these polymers; and to additive packages comprising such copolymers. The invention also relates to quaternary and higher copolymers which comprise the abovementioned monomers in copolymerized form.

On temperature depression, mineral oils comprising paraffin waxes, such as middle distillates, diesel and heating oils, exhibit a significant deterioration in the flow properties. The cause of this lies in the crystallization of relatively long-chain paraffins which occurs from the cloudpoint temperature, which forms large platelet-shaped wax crystals. These wax crystals have a spongelike structure and lead to incorporation of other fuel constituents in the crystal composite. The occurrence of these crystals leads rapidly to the conglutination of fuel filters, both in tanks and in motor vehicles. At temperatures below the pour point (PP), flow of the fuel finally no longer takes place.

To alleviate these problems, fuel additives have already been added for some time to fuel additives in small concentrations, which frequently consist of combinations of nucleators for early formation of ultrasmall crystals of the paraffins with the actual cold flow improvers (also known as CFIs or MDFIs). These in turn exhibit similar crystallization properties as the paraffins of the fuel, but prevent their growth, such that passage through the filter is possible at significantly lower temperatures compared to the unadditized fuel. As a measure of this, the so-called cold filter plugging point (CFPP) is determined. As a further additive, it is possible to use so-called wax antisettling additives (WASAs), which prevent the sinking of the ultrasmall crystals in the fuel.

According to the properties of the base fuel and of the additive, cold flow improvers are metered in in amounts of from about 50 to 500 ppm. Various CFI products are known from the prior art (cf., for example, U.S. Pat. Nos. 3,038,479, 3,627,838 and 3,961,961, EP-A-0,261,957 or DE-A-31 41 507 and 25 15 805). Common CFIs are usually polymeric compounds, especially ethylene-vinyl acetate (EVA) copolymers, for example the products sold under the trade name Keroflux by BASF AG.

Combinations of conventional CFIs with lubricity improvers (esters of mono- or polycarboxylic acids with mono- or polyalcohols) are also described as improved CFI combinations (EP-A-0 721 492).

WO 2005/054314 describes the use of polymers which comprise, in copolymerized form, an α-olefin, at least one alkenyl ester and at least one ester of an α,β-unsaturated carboxylic acid as cold flow improvers. The esters of α,β-unsaturated carboxylic acids are generally also those which derive from higher alcohols, Specifically, however, only the esters of alcohols with a maximum of 8 carbon atoms are described.

There is a continuing need for further additives with CFI properties, especially those which can be used less expensively, for example because they improve the cold properties of fuel oils or lubricants and especially the filterability of fuel oils in a lower dosage than commercially available CFIs.

It was accordingly an object of the present invention to provide novel additives of this type.

It has been found that, surprisingly, terpolymers or higher copolymers of α-olefins, at least one alkenyl ester and esters of α,β-unsaturated carboxylic acids in which the average number of carbon atoms in the alcohol constituent of the α,β-unsaturated carboxylic esters, in the acid constituent of any second alkenyl ester copolymerized and in the alcohol constituent of any copolymerized α,β-unsaturated dicarboxylic ester is from 8.5 to 20 can be handled significantly better than conventional CFIs and also influence the cold flow properties of fuel oils and lubricants additized with them in an even more positive manner than conventional CFIs.

The object is accordingly achieved by the use (A) of a polymer A which is formed from monomers comprising at least one monomer of the formula M1, at least one monomer of the formula M2, at least one monomer of the formula M3, if appropriate at least one monomer of the formula M4 and if appropriate at least one monomer of the formula M5, where M1, M2, M3, M4 and M5 have the following general formulae:

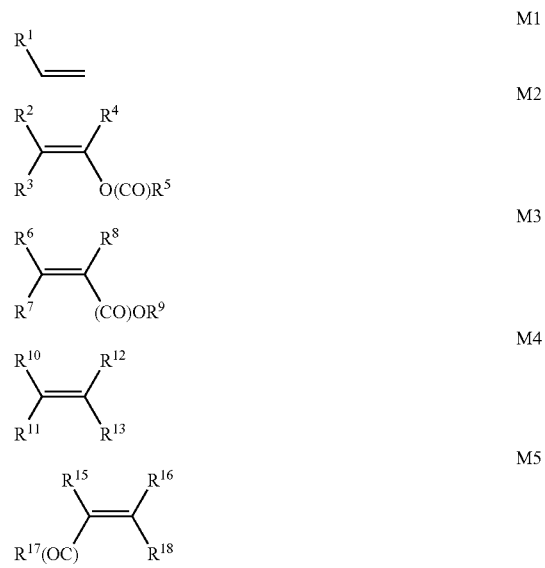

in which
$R^1$ is H or $C_1$-$C_{40}$-alkyl;
$R^2$, $R^3$ and $R^4$ are each independently H or $C_1$-$C_4$-alkyl;
$R^5$ is $C_1$-$C_{20}$-alkyl;
$R^6$, $R^7$ and $R^8$ are each independently H or $C_1$-$C_4$-alkyl;
$R^9$ is branched $C_9$-$C_{20}$-alkyl;
$R^{10}$, $R^{11}$ and $R^{12}$ are each independently H or $C_1$-$C_4$-alkyl;
$R^{13}$ is $O(CO)R^{14}$;
$R^{14}$ is $C_3$-$C_{19}$-alkyl;
$R^{15}$ is H or $C_1$-$C_4$-alkyl;
$R^{17}$ is $OR^{19}$;
one of the $R^{16}$ and $R^{18}$ radicals is —(CO)$R^{20}$ and the other radical is H or $C_1$-$C_4$-alkyl;
$R^{20}$ is $OR^{21}$; and
$R^{19}$ and $R^{21}$ are each independently H or $C_1$-$C_{20}$-alkyl;
or $R^{17}$ and $R^{20}$ together form an —O— group;
with the proviso that the average number of carbon atoms of all $R^9$, $R^{13}$, $R^{19}$ and $R^{21}$ radicals is from 8.5 to 20 and that $R^5$ and $R^{14}$ are different,
or
(B) of a polymer B which is formed from monomers comprising at least one monomer of the formula M1, at least one monomer of the formula M2, at least two monomers of the formula M3, if appropriate at least one monomer of the formula M4 and if appropriate at least one monomer of the formula M5, where M1, M2, M3, M4 and M5 each possess the general formulae M1 to M5 specified for (A), in which $R^1, R^2, R^3, R^4, R^5, R^6, R^7, R^8, R^{10}, R^{11}, R^{12}, R^{13}, R^{14}, R^{15}, R^{16}, R^{17}, R^{18}, R^{19}, R^{20}$ and $R^{21}$ are each as defined for (A), and in which $R^9$ is $C_4$-$C_{20}$-alkyl, preferably $C_6$-$C_{20}$-alkyl, in the first monomer M3 and is $C_9$-$C_{20}$-alkyl in the second and in each further monomer M3, where the $R^9$ radicals in the different monomers M3 are different, with the proviso that the average number of carbon atoms of all $R^9$, $R^{13}$, $R^{19}$ and $R^{21}$ radicals is from 8.5 to 20 and that $R^5$ and $R^{14}$ are different, as an additive for fuel oils and lubricants.

The polymers A and B used in accordance with the invention are not graft copolymers.

Unless stated otherwise, the following general definitions apply in the context of the present invention:

$C_1$-$C_{40}$-Alkyl is a linear or branched alkyl radical having from 1 to 40 carbon atoms. Examples thereof are methyl, ethyl, n-propyl, isopropyl, n-butyl, sec-butyl, isobutyl, tert-butyl, pentyl, hexyl, heptyl, octyl, 2-ethylhexyl, nonyl, decyl, 2-propylheptyl, 4-methyl-2-propylhexyl, undecyl, dodecyl, tridecyl, tetradecyl, pentadecyl, hexadecyl, heptadecyl, octadecyl, nonadecyl, eicosyl, hencosyl, docosyl, tricosyl, tetracosyl, pentacosyl, hexacosyl, heptacosyl, octacosyl, nonacosyl, squalyl, their constitutional isomers, higher homologs and the accompanying constitutional isomers.

$C_1$-$C_{20}$-Alkyl is a linear or branched alkyl radical having from 1 to 20 carbon atoms. Examples thereof are methyl, ethyl, n-propyl, isopropyl, n-butyl, sec-butyl, isobutyl, tert-butyl, pentyl, neopentyl, hexyl, heptyl, octyl, 2-ethylhexyl, nonyl, decyl, 2-propylheptyl, 4-methyl-2-propylhexyl, undecyl, dodecyl, tridecyl, tetradecyl, pentadecyl, hexadecyl, heptadecyl, octadecyl, nonadecyl, eicosyl and their constitutional isomers.

$C_1$-$C_{10}$-Alkyl is a linear or branched alkyl radical having from 1 to 10 carbon atoms. Examples thereof are methyl, ethyl, n-propyl, isopropyl, n-butyl, sec-butyl, isobutyl, tert-butyl, pentyl, hexyl, heptyl, octyl, 2-ethylhexyl, nonyl, decyl, 2-propylheptyl, 4-methyl-2-propylhexyl and their constitutional isomers.

$C_1$-$C_9$-Alkyl is a linear or branched alkyl radical having from 1 to 9 carbon atoms. Examples thereof are methyl, ethyl, n-propyl, isopropyl, n-butyl, sec-butyl, isobutyl, tert-butyl, pentyl, hexyl, heptyl, octyl, 2-ethylhexyl, nonyl and their constitutional isomers.

$C_1$-$C_4$-Alkyl is a linear or branched alkyl radical having from 1 to 4 carbon atoms. Examples thereof are methyl, ethyl, n-propyl, isopropyl, n-butyl, sec-butyl, isobutyl and tert-butyl.

$C_1$-$C_3$-Alkyl is a linear or branched alkyl radical having from 1 to 3 carbon atoms. Examples thereof are methyl, ethyl, n-propyl and isopropyl.

$C_{11}$-$C_{13}$-Alkyl is a linear or branched alkyl radical having from 11 to 13 carbon atoms. Examples thereof are undecyl, dodecyl, tridecyl and their constitutional isomers.

$C_{10}$-$C_{12}$-Alkyl is a linear or branched alkyl radical having from 10 to 12 carbon atoms. Examples thereof are decyl, 2-propylheptyl, 4-methyl-2-propylhexyl, undecyl, dodecyl and their constitutional isomers. $C_{10}$-$C_{14}$-Alkyl is a linear or branched alkyl radical having from 10 to 14 carbon atoms. Examples thereof, in addition to the alkyl radicals specified above for $C_{10}$-$C_{12}$-alkyl, are tridecyl and tetradecyl and their constitutional isomers. $C_{10}$-$C_{16}$-Alkyl is a linear or branched alkyl radical having from 10 to 16 carbon atoms. Examples thereof, in addition to the alkyl radicals specified above for $C_{10}$-$C_{14}$-alkyl, are pentadecyl and hexadecyl and their constitutional isomers. $C_{10}$-$C_{18}$-Alkyl is a linear or branched alkyl radical having from 10 to 18 carbon atoms. Examples thereof, in addition to the alkyl radicals specified above for $C_{10}$-$C_{16}$-alkyl, are heptadecyl and octadecyl and their constitutional isomers. $C_{10}$-$C_{20}$-Alkyl is a linear or branched alkyl radical having from 10 to 20 carbon atoms. Examples thereof, in addition to the alkyl radicals specified above for $C_{10}$-$C_{18}$-alkyl, are nonadecyl and eicosanyl and their constitutional isomers.

$C_9$-$C_{12}$-Alkyl is a linear or branched alkyl radical having from 9 to 12 carbon atoms. Examples thereof, in addition to the alkyl radicals specified above for $C_{10}$-$C_{12}$-alkyl, are nonyl and constitutional isomers thereof. $C_9$-$C_{13}$-Alkyl is a linear or branched alkyl radical having from 9 to 13 carbon atoms. Examples thereof, in addition to the alkyl radicals specified above for $C_9$-$C_{12}$-alkyl, are tridecyl and constitutional isomers thereof. $C_9$-$C_{14}$-Alkyl is a linear or branched alkyl radical having from 9 to 14 carbon atoms. Examples thereof, in addition to the alkyl radicals specified above for $C_9$-$C_{13}$-alkyl, are tetradecyl and constitutional isomers thereof. $C_9$-$C_{15}$-Alkyl is a linear or branched alkyl radical having from 9 to 15 carbon atoms. Examples thereof, in addition to the alkyl radicals specified above for $C_9$-$C_{14}$-alkyl, are pentadecyl and constitutional isomers thereof. $C_9$-$C_{16}$-Alkyl is a linear or branched alkyl radical having from 9 to 16 carbon atoms. Examples thereof, in addition to the alkyl radicals specified above for $C_9$-$C_{15}$-alkyl, are hexadecyl and constitutional isomers thereof. $C_9$-$C_{18}$-Alkyl is a linear or branched alkyl radical having from 9 to 18 carbon atoms. Examples thereof, in addition to the alkyl radicals specified above for $C_9$-$C_{16}$-alkyl, are heptadecyl and octadecyl and their constitutional isomers. $C_9$-$C_{19}$-Alkyl is a linear or branched alkyl radical having from 9 to 19 carbon atoms. Examples thereof, in addition to the alkyl radicals specified above for $C_9$-$C_{18}$-alkyl, are nonadecyl and constitutional isomers thereof. $C_9$-$C_{20}$-Alkyl is a linear or branched alkyl radical having from 9 to 20 carbon atoms. Examples thereof, in addition to the alkyl radicals specified above for $C_9$-$C_{19}$-alkyl, are eicosyl and constitutional isomers thereof.

$C_8$-$C_{12}$-Alkyl is a linear or branched alkyl radical having from 8 to 12 carbon atoms. Examples thereof, in addition to the alkyl radicals specified above for $C_9$-$C_{12}$-alkyl, are octyl, 2-ethylhexyl and further constitutional isomers thereof. $C_8$-$C_{14}$-Alkyl is a linear or branched alkyl radical having from 8 to 14 carbon atoms. Examples thereof, in addition to the alkyl radicals specified above for $C_8$-$C_{12}$-alkyl, are tridecyl, tetradecyl and constitutional isomers thereof. $C_8$-$C_{16}$-Alkyl is a linear or branched alkyl radical having from 8 to 16 carbon atoms. Examples thereof, in addition to the alkyl radicals specified above for $C_8$-$C_{14}$-alkyl, are pentadecyl, hexadecyl and constitutional isomers thereof. $C_8$-$C_{18}$-Alkyl is a linear or branched alkyl radical having from 8 to 18 carbon atoms. Examples thereof, in addition to the alkyl radicals specified above for $C_8$-$C_{16}$-alkyl, are heptadecyl and octadecyl and their constitutional isomers. $C_8$-$C_{20}$-Alkyl is a linear or branched alkyl radical having from 8 to 20 carbon atoms. Examples thereof, in addition to the alkyl radicals specified above for $C_8$-$C_{18}$-alkyl, are nonadecyl, eicosyl and constitutional isomers thereof.

$C_7$-$C_8$-Alkyl is a linear or branched alkyl radical having from 7 to 8 carbon atoms. Examples thereof are heptyl, octyl, 2-ethylhexyl and their constitutional isomers.

$C_6$-$C_8$-Alkyl is a linear or branched alkyl radical having from 6 to 8 carbon atoms. Examples thereof, in addition to the alkyl radicals specified above for $C_7$-$C_8$-alkyl, are hexyl and constitutional isomers thereof. $C_6$-$C_{12}$-Alkyl is a linear or branched alkyl radical having from 6 to 12 carbon atoms.

Examples thereof, in addition to the alkyl radicals specified above for $C_6$-$C_8$-alkyl, are heptyl, octyl, 2-ethylhexyl, nonyl, decyl, 2-propylheptyl, 4-methyl-2-propylhexyl, undecyl, dodecyl and their constitutional isomers. $C_6$-$C_{14}$-Alkyl is a linear or branched alkyl radical having from 6 to 14 carbon atoms. Examples thereof, in addition to the alkyl radicals specified above for $C_6$-$C_{12}$-alkyl, are tridecyl, tetradecyl and their constitutional isomers. $C_6$-$C_{16}$-Alkyl is a linear or branched alkyl radical having from 6 to 16 carbon atoms. Examples thereof, in addition to the alkyl radicals specified above for $C_6$-$C_{14}$-alkyl, are pentadecyl, hexadecyl and their constitutional isomers. $C_6$-$C_{18}$-Alkyl is a linear or branched alkyl radical having from 6 to 18 carbon atoms. Examples thereof, in addition to the alkyl radicals specified above for $C_6$-$C_{16}$-alkyl, are heptadecyl, octadecyl and their constitutional isomers. $C_6$-$C_{20}$-Alkyl is a linear or branched alkyl radical having from 6 to 20 carbon atoms. Examples thereof, in addition to the alkyl radicals specified above for $C_6$-$C_{18}$-alkyl, are nonadecyl, eicosyl and their constitutional isomers.

$C_3$-$C_{19}$-Alkyl is a linear or branched alkyl radical having from 3 to 19 carbon atoms. Examples thereof, in addition to the alkyl radicals specified above for $C_9$-$C_{19}$-alkyl, are methyl, ethyl, n-propyl, isopropyl, n-butyl, sec-butyl, isobutyl, tert-butyl, pentyl, hexyl, heptyl, octyl, 2-ethylhexyl and their constitutional isomers.

$C_4$-$C_{20}$-Alkyl is a linear or branched alkyl radical having from 4 to 20 carbon atoms. Examples thereof, in addition to the alkyl radicals specified above for $C_6$-$C_{20}$-alkyl, are n-butyl, sec-butyl, isobutyl, tert-butyl, pentyl and constitutional isomers thereof.

Branched $C_9$-$C_{20}$-alkyl is a nonlinear alkyl radical having from 9 to 20 carbon atoms. The carbon atom through which the alkyl radical is bonded to the rest of the molecule is preferably not the start of a branch. Examples thereof are 2-propylhept-1-yl, 4-methyl-2-propylhex-1-yl and other nonlinear decyl isomers, nonlinear undecyl isomers, nonlinear dodecyl isomers, nonlinear tridecyl isomers, nonlinear tetradecyl isomers, nonlinear pentadecyl isomers, nonlinear hexadecyl isomers, nonlinear heptadecyl isomers, nonlinear octadecyl isomers, nonlinear nonadecyl isomers and nonlinear eicosyl isomers.

Branched $C_6$-$C_{20}$-alkyl is a nonlinear alkyl radical having from 6 to 20 carbon atoms. The carbon atom through which the alkyl radical is bonded to the rest of the molecule is preferably not the start of a branch. Examples thereof are, as well as the radicals specified above for branched $C_9$-$C_{20}$-alkyl, nonlinear hexyl isomers, nonlinear heptyl isomers and nonlinear octyl isomers, such as 2-ethylhexyl.

Branched $C_4$-$C_{20}$-alkyl is a nonlinear alkyl radical having from 4 to 20 carbon atoms. The carbon atom through which the alkyl radical is bonded to the rest of the molecule is preferably not the start of a branch. Examples thereof are, as well as the radicals specified above for branched $C_6$-$C_{20}$-alkyl, nonlinear pentyl isomers, such as neopentyl, and nonlinear butyl isomers, such as isobutyl and, less preferably, sec-butyl and tert-butyl.

$C_1$-$C_4$-Alkoxy is a linear or branched $C_1$-$C_4$-alkyl radical bonded via oxygen. Examples thereof are methoxy, ethoxy, propoxy, isopropoxy, n-butoxy, sec-butoxy, isobutoxy and tert-butoxy.

The alkyl radicals may be unsubstituted or mono- or polysubstituted. Suitable substituents are, for example, OH, $C_1$-$C_4$-alkoxy, $NR^aR^b$ ($R^a$ and $R^b$ are each independently H or $C_1$-$C_4$-alkyl) or carbonyl ($COR^a$). However, they are preferably unsubstituted.

a) Polymers Used in Accordance with the Invention

The statements made below regarding preferred embodiments of the polymers used in accordance with the invention and of the monomers from which they are formed apply both alone and especially in combination with one another. The statements apply both to polymer A and to polymer B, unless specified that a statement relates to only one of these polymers.

In the polymers A and B used in accordance with the invention, the average number of carbon atoms of all $R^9$, $R^{13}$, $R^{19}$ and $R^{21}$ radicals is from 8.5 to 20, in particular from 9 to 20, preferably from 8.5 to 18, in particular from 9 to 18, more preferably from 8.5 to 16, in particular from 9 to 16, even more preferably from 8.5 to 14, in particular from 9 to 14, even more preferably from 8.5 to 12, especially from 9 to 12, and specifically from 10 to 12. The average number of carbon atoms of all $R^9$, $R^{13}$, $R^{19}$ and $R^{21}$ radicals in i different monomers M3, in j different monomers M4 and in k different monomers M5 can be calculated by the following general formula:

$$\frac{a_1 \cdot b_1 + a_2 \cdot b_2 + \ldots + a_i \cdot b_i + c_1 \cdot d_1 + c_2 \cdot d_2 + \ldots + c_j \cdot d_j + e_1 \cdot f_1 + e_2 \cdot f_2 + \ldots + e_k \cdot f_k + e_1 \cdot g_1 + e_2 \cdot g_2 + \ldots + e_k \cdot g_k}{\sum_i a + \sum_j c + 2 \cdot \sum_k e}$$

in which $a_1, a_2, \ldots a_i$ is the quantitative proportion (mole fraction) of the different monomers M3 present in the polymer;

$b_1, b_2, \ldots b_i$ is the number of carbon atoms in the $R^9$ radical in the corresponding monomer M3;

$c_1, c_2, \ldots c_i$ is the quantitative proportion (mole fraction) of the different monomers M4 present in the polymer;

$d_1, d_2, \ldots d_i$ is the number of carbon atoms in the $R^{13}$ radical in the corresponding monomer M4;

$e_1, e_2, \ldots e_k$ is the quantitative proportion (mole fraction) of the different monomers M5 present in the polymer;

$f_1, f_2, \ldots f_k$ is the number of carbon atoms in the $R^{19}$ radical in the corresponding monomer M5;

$g_1, g_2, \ldots g_k$ is the number of carbon atoms in the $R^{21}$ radical in the corresponding monomer M5;

$$\sum_i a$$

is the sum of all mole fractions $a_1$ to $a_i$;

$$\sum_j c$$

is the sum of all mole fractions $c_1$ to $c_j$; and $$\sum_k e$$

is the sum of all mole factions $e_1$ to $e_k$.

In the polymers used in accordance with the invention, the monomers M1, M2, M3, M4 and M5 may be present in the polymer in the following molar proportions (Mx/(M1+M2+M3+M4+M5)):

M1. preferably 0.60 to 0.97;
M2. preferably 0.02 to 0.25;
M3. preferably 0.01 to 0.15
M4. preferably 0 to 0.10
M5. preferably 0 to 0.02.

In the case that the polymers used in accordance with the invention do not comprise monomers M4 and M5 in copolymerized form:
M1. preferably 0.60 to 0.95, more preferably 0.7 to 0.93, in particular 0.8 to 0.9;
M2. preferably 0.04 to 0.25, more preferably 0.06 to 0.2, in particular 0.08 to 0.15;
M3. preferably 0.01 to 0.15, more preferably 0.01 to 0.1, in particular 0.02 to 0.05.

In the case that the polymers used in accordance with the invention comprise monomer M4 in copolymerized form:
M1. preferably 0.60 to 0.95, more preferably 0.7 to 0.93 in particular 0.8 to 0.9;
M2. preferably 0.04 to 0.25, more preferably 0.05 to 0.2, in particular 0.08 to 0.15;
M3. preferably 0.008 to 0.1, more preferably 0.015 to 0.08, in particular 0.015 to 0.04;
M4. preferably 0.002 to 0.05, more preferably 0.005 to 0.02, in particular 0.005 to 0.01.

In the case that the polymers in accordance with the invention comprise monomer M5 in copolymerized form:
M1. preferably 0.60 to 0.95, more preferably 0.7 to 0.93 in particular 0.8 to 0.9;
M2. preferably 0.04 to 0.25, more preferably 0.05 to 0.2, in particular 0.08 to 0.15;
M3. preferably 0.009 to 0.13, more preferably 0.015 to 0.08, in particular 0.015 to 0.04;
M5. preferably 0.001 to 0.02, more preferably 0.005 to 0.02, in particular 0.005 to 0.01.

In the case that the polymers used in accordance with the invention comprise both monomer M4 and monomer M5 in copolymerized form:
M1. preferably 0.60 to 0.95, more preferably 0.7 to 0.93 in particular 0.8 to 0.9;
M2. preferably 0.04 to 0.25, more preferably 0.05 to 0.2, in particular 0.08 to 0.15;
M3. preferably 0.008 to 0.1, more preferably 0.015 to 0.08, in particular 0.015 to 0.04;
M4. preferably 0.001 to 0.025, more preferably 0.0025 to 0.01, in particular 0.0025 to 0.005;
M5. preferably 0.001 to 0.025, more preferably 0.0025 to 0.01, in particular 0.0025 to 0.005.

M2 is preferably present in the polymer in a greater molar proportion than M3. The molar ratio of copolymerized M2 to copolymerized M3 is preferably at least 2:1, for example from 2:1 to 10:1 or preferably from 2:1 to 8:1 or especially from 2:1 to 7:1, more preferably at least 2.5:1, for example from 2.5:1 to 10:1 or preferably from 2.5:1 to 8:1 or especially from 2.5:1 to 7:1, and especially from 2.5:1 to 6:1.

The molar ratio of M3 to M4, in the case that no M5 is present in the copolymer, is determined in particular by the chain length of the $R^9$ and $R^{13}$ radicals in conjunction with the inventive proviso (average number of carbon atoms in all $R^9$ and $R^{13}$ radicals=from 8.5 to 20). Monomer M4 is preferably used in polymer B and is preferably used in particular when the average number of carbon atoms in all $R^9$ radicals in polymer B is less than 8.5 and especially less than 9; monomer M4 then preferably serves to balance out the excessively low number of carbon atoms in the $R^9$ radicals. Accordingly, in this case, according to the quantitative proportion in which M4 is copolymerized, $R^{13}$ must contain at least 9, (i.e. from 9 to 20) carbon atoms (i.e. $R^{14}$=$C_8$-$C_{19}$-alkyl). In this case, the molar ratio of M3 to M4 is preferably from 1:1 to 8:1, more preferably from 1.5:1 to 6:1 and especially from 1.5:1 to 5:1.

When the average number of carbon atoms in all $R^9$ radicals in polymer B is less than 8.5 and especially less than 9, alternatively or additionally to monomer M4, it is also possible for monomer M5 to serve to balance out the carbon number. It is self-evident that, in this case, the average number of all carbon atoms in the $R^{19}$ and $R^{21}$ radicals, depending on the quantitative proportion in which M5 is copolymerized, must be sufficiently great that the inventive proviso is satisfied.

Irrespective of this, however, M5 is preferably present in the polymer in only minor amounts, i.e. at most 2 mol %, more preferably at most 1 mol %.

In a specific embodiment of the invention, the polymer does not comprise any copolymerized M5.

The monomers M1 are preferably monoalkenes with a terminal double bond, such as ethylene, propylene, 1-butene, 1-pentene, 1-hexene, 1-heptene, 1-octene, 1-nonene, 1-decene, their constitutional isomers and the higher monounsaturated homologs having up to 40 carbon atoms.

In the monomers M1, $R^1$ is preferably H or $C_1$-$C_{20}$-alkyl, more preferably H or $C_1$-$C_{10}$-alkyl and even more preferably H or $C_1$-$C_4$-alkyl. In particular, $R^1$ is H, methyl or ethyl. Accordingly, monomer M1 is especially ethylene, propylene or 1-butene. $R^1$ is especially H, i.e. M1 is especially ethylene.

Monomer M2 is the alkenyl ester, for example the vinyl or propenyl ester, preferably the vinyl ester, of an aliphatic carboxylic acid which may be unsaturated or preferably saturated.

In monomer M2, the $R^2$, $R^3$ and $R^4$ radicals are preferably each H or methyl. More preferably, two of the $R^2$, $R^3$ and $R^4$ radicals are each H and the other radical is H or methyl. In particular, all three $R^2$, $R^3$ and $R^4$ radicals are H.

Examples of the alkenyl esters, especially of the vinyl or propenyl esters, of an aliphatic carboxylic acid which may be saturated or unsaturated are the vinyl or propenyl esters of aliphatic $C_2$-$C_{20}$-carboxylic acids such as acetic acid, propionic acid, butyric acid, valeric acid, isovaleric acid, pivalic acid, neopentanoic acid, caproic acid, enanthic acid, caprylic acid, pelargonic acid, 2-ethylhexanoic acid, Versatic™ acids, especially neononanoic acid and neodecanoic acid (e.g. VeoVa™=vinyl ester of Versatic acid), capric acid, neoundecanoic acid, lauric acid, tridecanoic acid, myristic acid, pentadecanoic acid, palmitic acid, margaric acid, stearic acid, nonadecanoic acid and arachic acid. Preference is given to the vinyl esters of the carboxylic acids mentioned.

$R^5$ is preferably $C_1$-$C_9$-alkyl. Accordingly, preferred monomers M2 are the alkenyl esters, in particular the propenyl and especially the vinyl esters, of saturated aliphatic $C_2$-$C_{10}$-carboxylic acids such as acetic acid, propionic acid, butyric acid, valeric acid, isovaleric acid, pivalic acid, neopentanoic acid, caproic acid, enanthic acid, caprylic acid, pelargonic acid, 2-ethylhexanoic acid, Versatic™ acids, especially neononanoic acid and neodecanoic acid (e.g. VeoVa™=vinyl ester of Versatic acid) and capric acid.

More preferably, $R^5$ is $C_1$-$C_3$-alkyl. Accordingly, preferred monomers M2 are the alkenyl esters, in particular the propenyl and especially the vinyl esters, of saturated aliphatic $C_2$-$C_4$-carboxylic acids, such as acetic acid, propionic acid and butyric acid. More preferably, $R^5$ is ethyl or methyl and especially methyl. Accordingly, more preferred monomers M2 are the alkenyl esters, in particular the propenyl and especially the vinyl esters, of acetic acid or propionic acid and especially of acetic acid.

Monomer M2 is more preferably vinyl acetate or vinyl propionate and especially vinyl acetate.

In monomer M3, the $R^6$, $R^7$ and $R^8$ radicals are preferably H or methyl. More preferably, two of the $R^6$, $R^7$ and $R^8$ radicals are each H and the other radical is H or methyl. In particular, all three $R^6$, $R^7$ and $R^8$ radicals are H.

Accordingly, monomers M3 are preferably the esters of α,β-unsaturated carboxylic acids which are selected from acrylic acid ($R^6$, $R^7$ and $R^8$=H), methacrylic acid ($R^6$, $R^7$=H; $R^8$=methyl), crotonic acid ($R^7$, $R^8$=H; $R^6$=methyl) and isocrotonic acid ($R^6$, $R^8$=H; $R^7$=methyl), more preferably from acrylic acid and methacrylic acid and especially acrylic acid.

Examples of such preferred α,β-unsaturated carboxylic esters M3 in polymer B include:

First monomer M3 in which $R^9$ is $C_4$-$C_{20}$-alkyl. acrylic esters of $C_4$-$C_{20}$-alkanols, such as n-butyl acrylate, sec-butyl acrylate, isobutyl acrylate, tert-butyl acrylate, n-pentyl acrylate, neopentyl acrylate, isopentyl acrylate, hexyl acrylate, heptyl acrylate, octyl acrylate, 2-ethylhex-1-yl acrylate, nonyl acrylate, decyl acrylate, 2-propylhept-1-yl acrylate, 4-methyl-2-propylhex-1-yl acrylate, undecyl acrylate, lauryl acrylate, tridecyl acrylate, myristyl acrylate, palmityl acrylate, stearyl acrylate, nonadecyl acrylate and eicosyl acrylate; and also the corresponding methacrylic, crotonic and isocrotonic esters, preference being given to the acrylates (acrylic esters).

Second and each further monomer M3 in which $R^9$ is $C_9$-$C_{20}$-alkyl. acrylic esters of $C_9$-$C_{20}$-alkanols, such as nonyl acrylate, decyl acrylate, 2-propylhept-1-yl acrylate, 4-methyl-2-propylhex-1-yl acrylate, undecyl acrylate, lauryl acrylate, tridecyl acrylate, myristyl acrylate, palmityl acrylate, stearyl acrylate, nonadecyl acrylate and eicosyl acrylate; and also the corresponding methacrylic, crotonic and isocrotonic esters, preference being given to the acrylates (acrylic esters).

Examples of such preferred α,β-unsaturated carboxylic esters M3 in polymer A include:

Monomer M3 in which $R^9$ is branched $C_9$-$C_{20}$-alkyl. acrylic esters of branched $C_9$-$C_{20}$-alkanols, such as acrylic esters of nonlinear nonyl isomers, acrylic esters of nonlinear decanols, such as 2-propylhept-1-yl acrylate and 4-methyl-2-propylhex-1-yl acrylate, acrylic esters of nonlinear undecanols, acrylic esters of nonlinear dodecanols, acrylic esters of nonlinear tridecanols, acrylic esters of nonlinear tetradecanols, acrylic esters of nonlinear pentadecanols, acrylic esters of nonlinear hexadecanols, acrylic esters of nonlinear heptadecanols, acrylic esters of nonlinear octadecanols, acrylic esters of nonlinear nonadecanols and acrylic esters of nonlinear eicosanols; and also the corresponding methacrylic, crotonic and isocrotonic esters, preference being given to the acrylates (acrylic esters).

In the first monomer M3 of polymer B, $R^9$ is $C_4$-$C_{20}$-alkyl, preferably $C_6$-$C_{20}$-alkyl, e.g. $C_6$-$C_{18}$-alkyl, or preferably $C_6$-$C_{16}$-alkyl or more preferably $C_6$-$C_{14}$-alkyl or especially $C_6$-$C_{12}$-alkyl, and more preferably $C_8$-$C_{20}$-alkyl, e.g. $C_8$-$C_{18}$-alkyl or preferably $C_8$-$C_{16}$-alkyl or more preferably $C_8$-$C_{14}$-alkyl or especially $C_8$-$C_{12}$-alkyl. $R^9$ is especially $C_8$-$C_{12}$-alkyl. $R^9$ in the second monomer and in each further monomer M3 of polymer B is $C_9$-$C_{20}$-alkyl, for example $C_9$-$C_{18}$-alkyl or preferably $C_9$-$C_{16}$-alkyl or more preferably $C_9$-$C_{14}$-alkyl or in particular $C_9$-$C_{12}$-alkyl; and more preferably $C_{10}$-$C_{20}$-alkyl, for example $C_{10}$-$C_{18}$-alkyl or preferably $C_{10}$-$C_{16}$-alkyl and more preferably $C_{10}$-$C_{14}$-alkyl or in particular $C_{10}$-$C_{12}$-alkyl. $R^9$ is especially $C_{10}$-$C_{12}$-alkyl.

The polymer B comprises at least two different monomers M3 in copolymerized form. In this case, it is preferred that $R^9$ in a first monomer M3 is $C_6$-$C_{20}$-alkyl and $R^9$ in the second and each further monomer M3 is $C_9$-$C_{20}$-alkyl. The different monomers M3 preferably differ by the $R^9$ radicals and possibly also by the $R^6$, $R^7$ and $R^8$ radicals. More preferably, the different monomers M3, however, differ exclusively by the $R^9$ radicals. The different $R^9$ radicals may differ by the number of carbon atoms and/or by their constitution. In particular, all monomers M3 are acrylic esters (i.e. $R^6$, $R^7$ and $R^8$ are each H) which derive formally from different alcohols $R^9$OH.

In preferred monomers M3 of polymer B, the proviso applies that the average number of carbon atoms of all $R^9$ radicals is from 8.5 to 20, for example from 8.5 to 18 or from 8.5 to 16 or from 8.5 to 14 or from 8.5 to 12, and preferably from 9 to 20, for example from 9 to 18 or from 9 to 16 or from 9 to 14 or from 9 to 12.

More preferably, in at least one monomer M3 of polymer B, the $R^9$ radical is branched alkyl. In a particular embodiment, it is preferred that the molar ratio of copolymerized monomers M3 with a branched alkyl $R^9$ radical to copolymerized monomers M3 with a linear alkyl $R^9$ radical is from 1:5 to 1:0.

In a particularly preferred embodiment of polymer B, $R^9$ in one of the monomers M3 is 2-propylheptyl. More preferably, this one monomer M3 is 2-propylheptyl acrylate.

In a further preferred embodiment of polymer B, the $R^9$ radicals of all copolymerized monomers M3 are $C_9$-$C_{20}$-alkyl, in particular $C_{10}$-$C_{20}$-alkyl, preferably $C_9$-$C_{18}$-alkyl, in particular $C_{10}$-$C_{18}$-alkyl, more preferably $C_9$-$C_{16}$-alkyl, in particular $C_{10}$-$C_{16}$-alkyl, even more preferably $C_9$-$C_{14}$-alkyl, in particular $C_{10}$-$C_{14}$-alkyl, and especially $C_9$-$C_{12}$-alkyl, in particular $C_{10}$-$C_{12}$-alkyl. Preferably, in one of these monomers M3, $R^9$ is 2-propylheptyl. More preferably, this one monomer M3 is 2-propylheptyl acrylate. Preferably, in a second monomer M3, the $R^9$ radical is a decyl isomer other than 2-propylheptyl, especially 4-methyl-2-propylhexyl. In this case, the monomer M3 which comprises 2-propylheptyl as $R^9$ is preferably copolymerized in a greater molar proportion than the monomer M3 which comprises a different decyl isomer as $R^9$. The molar ratio of 2-propylheptyl ester to the different decyl isomer ester is preferably from 20:1 to 1.5:1, more preferably from 10:1 to 4:1. The second monomer M3 is preferably a decyl acrylate, especially 4-methyl-2-propylhexyl acrylate.

In an alternatively preferred embodiment of polymer B, the $R^9$ radical in one of the monomers M3 is $C_6$-$C_8$-alkyl, preferably $C_7$-$C_8$-alkyl, especially $C_8$-alkyl and specifically 2-ethylhexyl, while $R^9$ in the remaining monomers M3 is $C_9$-$C_{20}$-alkyl, in particular $C_{10}$-$C_{20}$-alkyl, preferably $C_9$-$C_{18}$-alkyl, in particular $C_{10}$-$C_{18}$-alkyl, more preferably $C_9$-$C_{16}$-alkyl, in particular $C_{10}$-$C_{16}$-alkyl, even more preferably $C_9$-$C_{14}$-alkyl, in particular $C_{10}$-$C_{14}$-alkyl, and especially $C_9$-$C_{12}$-alkyl, in particular $C_{10}$-$C_{12}$-alkyl. In particular, $R^9$ in these further monomers M3 is 2-propylheptyl, 4-methyl-2-propylhexyl, lauryl and/or myristyl. More preferably, all monomers M3 are acrylates.

In a further alternatively preferred embodiment of polymer B, the latter comprises two monomers M3 of the formulae M3.1 and M3.2 and if appropriate at least one further monomer M3 of the formula M3.3:

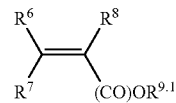

M3.1

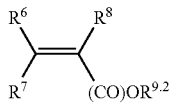

M3.2

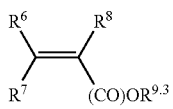

M3.3 where each $R^6$, each $R^7$ and each $R^8$ independently has one of the general or preferred definitions specified above;

$R^{9.1}$ is $C_6$-$C_{20}$-alkyl;

$R^{9.2}$ is $C_9$-$C_{20}$-alkyl; and each $R^{9.3}$ is independently $C_9$-$C_{20}$-alkyl;

with the proviso that the average number of the carbon atoms of the $R^{9.1}$, $R^{9.2}$ and $R^{9.3}$ radicals is from 9 to 20 and that $R^{9.1}$, $R^{9.2}$ and $R^{9.3}$ are different.

In a particularly preferred version of this embodiment, the $R^{9.1}$, $R^{9.2}$ and $R^{9.3}$ radicals are all $C_9$-$C_{20}$-alkyl, in particular $C_{10}$-$C_{20}$-alkyl, preferably $C_9$-$C_{18}$-alkyl, in particular $C_{10}$-$C_{18}$-alkyl, more preferably $C_9$-$C_{16}$-alkyl, in particular $C_{10}$-$C_{16}$-alkyl, even more preferably $C_9$-$C_{14}$-alkyl, in particular $C_{10}$-$C_{14}$-alkyl, and especially $C_9$-$C_{12}$-alkyl, in particular $C_{10}$-$C_{12}$-alkyl. The $R^{9.1}$ radical is preferably 2-propylheptyl. Preferably, $R^{9.2}$ is a decyl isomer other than 2-propylheptyl, especially 4-methyl-2-propylhexyl. M3.1 is preferably copolymerized in a greater molar proportion than M3.2. The molar ratio of M3.1 to M3.2 is preferably from 20:1 to 1.5:1, more preferably from 10:1 to 4:1. The monomers M3.1, M3.2 and M3.3 are preferably acrylates (i.e. $R^6$, $R^7$, $R^8$=H).

In an alternatively preferred version of this embodiment, the $R^{9.1}$ radical is $C_6$-$C_8$-alkyl, preferably $C_7$-$C_8$-alkyl, especially $C_8$-alkyl and specifically 2-ethylhexyl, while the $R^{9.2}$ and $R^{9.3}$ radicals in the remaining monomers M3.2 and M3.3 are each $C_9$-$C_{20}$-alkyl, in particular $C_{10}$-$C_{20}$-alkyl, preferably $C_9$-$C_{18}$-alkyl, in particular $C_{10}$-$C_{18}$-alkyl, more preferably $C_9$-$C_{16}$-alkyl, in particular $C_{10}$-$C_{16}$-alkyl, even more preferably $C_9$-$C_{14}$-alkyl and especially $C_{10}$-$C_{14}$-alkyl. Specifically, $R^{9.2}$ is 2-propylheptyl and $R^{9.3}$ is a different decyl isomer, especially 4-methyl-2-propylhexyl, or $R^{9.2}$ is lauryl and $R^{9.3}$ is myristyl. The monomers M3.1, M3.2 and M3.3 are preferably acrylates (i.e. $R^6$, $R^7$, $R^8$=H).

In a specific embodiment, the polymer comprises at least one monomer M3.3 and more specifically one monomer M3.3 in copolymerized form.

In the case that the average number of carbon atoms of all $R^9$ radicals in the monomers M3 in polymer B is from 8.5 to 20 and preferably from 9 to 20, the polymer B need not comprise any copolymerized monomers M4 and M5.

$R^9$ in monomer M3 of polymer A is branched $C_9$-$C_{20}$-alkyl, for example branched $C_9$-$C_{18}$-alkyl or preferably branched $C_9$-$C_{16}$-alkyl or more preferably branched $C_9$-$C_{14}$-alkyl or in particular branched $C_9$-$C_{12}$-alkyl; and more preferably branched $C_{10}$-$C_{20}$-alkyl, for example branched $C_{10}$-$C_{18}$-alkyl or preferably branched $C_{10}$-$C_{16}$-alkyl or more preferably branched $C_{10}$-$C_{14}$-alkyl and especially branched $C_{10}$-$C_{12}$-alkyl. $R^9$ is especially branched $C_{10}$-$C_{12}$-alkyl and even more especially $C_{10}$-alkyl.

When the polymer A comprises more than one monomer M3, the different monomers M3 differ by the $R^9$ radicals and/or by the $R^6$, $R^7$ and $R^8$ radicals. They preferably differ by the $R^9$ radicals and if appropriate also by the $R^6$, $R^7$ and $R^8$ radicals. More preferably, the different monomers M3, however, differ exclusively by the $R^9$ radicals. The different $R^9$ radicals may differ by the number of carbon atoms and/or by their constitution. In particular, all monomers M3 are acrylic esters (i.e. $R^6$, $R^7$ and $R^8$ are each H) which derive formerly from different alcohols $R^9$OH.

However, polymer A preferably comprises only one monomer M3.

In particular, $R^9$ in monomer M3 in polymer A is 2-propylheptyl.

In particular, monomer M3 in polymer A is 2-propylheptyl acrylate.

In a specific embodiment of polymer A, it does not comprise any copolymerized monomers M4 and M5.

Monomer M4, like monomer M2 too, is the alkenyl ester, for example the vinyl or propenyl ester, preferably the vinyl ester, of an aliphatic carboxylic acid which may be unsaturated or preferably saturated.

In monomer M4, the $R^{10}$, $R^{11}$ and $R^{12}$ radicals are preferably each H or methyl. More preferably, two of the $R^{10}$, $R^{11}$ and $R^{12}$ radicals are each H and the other radical is H or methyl. In particular, all three $R^{10}$, $R^{11}$ and $R^{12}$ radicals are H.

Examples of the alkenyl esters, especially of the vinyl or propenyl esters, of an aliphatic carboxylic acid which may be unsaturated or preferably saturated are the vinyl or propenyl esters of aliphatic $C_4$-$C_{20}$-carboxylic acids such as butyric acid, valeric acid, isovaleric acid, pivalic acid, neopentanoic acid, caproic acid, enanthic acid, caprylic acid, 2-ethylhexanoic acid, pelargonic acid, Versatic™ acids, especially neononanoic acid and neodecanoic acid (e.g. VeoVa™=vinyl ester of Versatic acid), capric acid, undecanoic acid, neoundecanoic acid, lauric acid, tridecanoic acid, myristic acid, pentadecanoic acid, palmitic acid, margaric acid, stearic acid, nonadecanoic acid and arachic acid. Preference is given to the vinyl esters of the carboxylic acids mentioned.

In the polymers used in accordance with the invention, the proviso applies that $R^5$ and $R^{14}$ are different. The difference may lie in the different number of carbon atoms in the alkyl $R^5$ and $R^{14}$ radicals and/or in their constitution. $R^5$ and $R^{14}$ preferably differ at least by the number of their carbon atoms. $R^{14}$ is preferably longer-chain than $R^5$. More preferably, $R^{14}$ comprises at least 5 carbon atoms, more preferably at least 8 carbon atoms and especially at least 10 carbon atoms more than $R^5$.

$R^{14}$ is preferably $C_9$-$C_{15}$-alkyl. Accordingly, preferred monomers M4 are the alkenyl esters, in particular the propenyl and especially the vinyl esters, of saturated aliphatic $C_{10}$-$C_{16}$-carboxylic acids such as capric acid, undecanoic acid, neoundecanoic acid, lauric acid, tridecanoic acid, myristic acid, pentadecanoic acid and palmitic acid. More preferably, $R^{14}$ is $C_9$-$C_{13}$-alkyl. Accordingly, preferred monomers M4 are the alkenyl esters, in particular the propenyl and especially the vinyl esters, of saturated aliphatic $C_{10}$-$C_{14}$-carboxylic acids such as capric acid, undecanoic acid, neoundecanoic acid, lauric acid, tridecanoic acid and myristic acid. More preferably, $R^{14}$ is $C_{11}$-$C_{13}$-alkyl and especially $C_{11}$-alkyl or $C_{13}$-alkyl. Accordingly, preferred monomers M4 are the alkenyl esters, in particular the propenyl and especially the vinyl esters, of saturated $C_{12}$-$C_{14}$-carboxylic acids such as lauric acid, tridecanoic acid and myristic acid and especially lauric acid and myristic acid.

In particular, M4 is vinyl laurate or vinyl myristate and more specifically vinyl laurate.

Monomer M5 is the acid anhydride of an ethylenically unsaturated aliphatic 1,2-dicarboxylic acid ($R^{17}$ and $R^{20}$ together form an —O— group), an ethylenically unsaturated aliphatic 1,2-dicarboxylic acid ($R^{19}$ and $R^{21}$=H), the monoester of an ethylenically unsaturated aliphatic 1,2-dicarboxylic acid of $C_1$-$C_{20}$-alcohols ($R^{19}$ or $R^{21}$=H and the other radical is $C_1$-$C_{20}$-alkyl) or the diester of an ethylenically unsaturated aliphatic 1,2-dicarboxylic acid of $C_1$-$C_{20}$-alcohols ($R^{19}$ and $R^{21}$=$C_1$-$C_{20}$-alkyl).

Preferably, $R^{15}$ and $R^{16}$ or $R^{18}$ is H. Accordingly, M5 is preferably maleic anhydride, maleic acid, fumaric acid, a maleic mono- or diester or a fumaric mono- or diester of $C_1$-$C_{20}$-alcohols.

Examples of fumaric and maleic mono- and diesters are monomethyl, monoethyl, monopropyl, monoisopropyl, mono-n-butyl, mono-sec-butyl, monoisobutyl, mono-tert-butyl, monopentyl, monohexyl, monoheptyl, monooctyl, mono-2-ethylhexyl, monononyl, monodecyl, mono-2-propylheptyl, mono-4-methyl-2-propylhexyl, monoundecyl, monododecyl, monotridecyl, monotetradecyl, monopentadecyl, monohexadecyl, monoheptadecyl, monooctadecyl, monononadecyl, monoeicosyl fumarates and maleates, and also the symmetrical and mixed fumaric and maleic diesters of the corresponding alcohols.

In an embodiment of the invention, the polymer B comprises at least one monomer M4 in copolymerized form. In this case, $R^{14}$ is preferably $C_9$-$C_{19}$-alkyl. Reference is made to the above remarks regarding even more preferred monomers M4. In this case, $R^9$ in the at least one monomer M3 in polymer B is preferably $C_6$-$C_{16}$-alkyl, more preferably $C_6$-$C_{14}$-alkyl, more preferably $C_6$-$C_{12}$-alkyl, even more preferably $C_6$-$C_{10}$-alkyl, especially $C_6$-$C_8$-alkyl, specifically $C_8$-alkyl and more specifically 2-ethylhexyl.

Polymers A and B used with particular preference are selected from ethylene/vinyl acetate/2-propylheptyl acrylate copolymers, ethylene/vinyl acetate/2-propylheptyl acrylate/4-methyl-2-propylhexyl acrylate copolymers, ethylene/vinyl acetate/2-ethylhexyl acrylate/2-propylheptyl acrylate copolymers, ethylene/vinyl acetate/2-ethylhexyl acrylate/2-propylheptyl acrylate/4-methyl-2-propylhexyl acrylate copolymers, ethylene/vinyl acetate/2-ethylhexyl acrylate/lauryl acrylate copolymers, ethylene/vinyl acetate/2-ethylhexyl acrylate/lauryl acrylate/myristyl acrylate copolymers, ethylene/vinyl acetate/2-ethylhexyl acrylate/vinyl laurate copolymers and ethylene/vinyl acetate/2-ethylhexyl acrylate/2-propylheptyl acrylate/4-methyl-2-propylhexyl acrylate/lauryl acrylate/myristyl acrylate copolymers. Among these, particular preference is given to the quaternary copolymers, i.e. those which are formed essentially from four different monomers. Even more preferred among these are the quaternary copolymers which comprise copolymerized 2-propylheptyl acrylate.

The polymers used in accordance with the invention preferably have a number-average molecular weight $M_n$ in the range from about 1000 to 20 000, more preferably from 1000 to 10 000, especially from 1500 to 6000 and specifically from 2000 to 4000 g/mol.

The polymers preferably have a weight-average molecular weight $M_w$ of from 1500 to 30 000, more preferably from 2000 to 20 000, especially from 3000 to 15 000, specifically from 4000 to 14 000, and/or an $M_w/M_n$ ratio of from 1.5 to 5.0, preferably from 1.8 to 4.0 and especially from 1.9 to 3.5.

The details of weight-average and number-average molecular weights $M_w$ and $M_n$ and their quotient PDI (PDI=$M_w/M_n$) given in the context of the present invention are based on values which have been determined by means of gel permeation chromatography (polyisobutene standards).

The viscosity of such polymers (determined according to Ubbelohde DIN 51562) is from about 5 to 25 000 mm²/s, preferably from about 10 to 1000 mm²/s, especially from about 50 to 700 mm²/s, in each case at a temperature of 120° C.

b) Inventive Polymers

The invention further relates to polymers A and B which are as defined above. The above remarks regarding suitable and preferred monomers M1, M2, M3, M4 and M5 and regarding the suitable and preferred composition of the polymers apply here correspondingly. The inventive polymers are not graft copolymers. The inventive polymer is especially a polymer B. Alternatively, the inventive polymer is especially a polymer A in which M3 is preferably 2-propylheptyl acrylate.

The polymers used in accordance with the invention and the inventive polymers are preferably formed essentially from the above-defined monomers M1, M2, M3, if appropriate M4 and if appropriate M5. "Essentially" means that the polymers comprise at most 5% by weight, preferably at most 3% by weight, more preferably at most 2% by weight and especially at most 1% by weight, based on the total weight of the polymer, of components different than M1, M2, M3, M4 and M5. For instance, as a result of preparation, small proportions of a compound used as a regulator (chain terminator) may possibly be present.

c) Preparation of the Polymers

The inventive polymers or polymers used in accordance with the invention are prepared by processes known per se, preferably by the processes known from the prior art (cf., for example, *Ullmann's Encyclopedia of Industrial Chemistry* 5th Edition, under: Waxes, Vol. A 28, p. 146 ff., V C H Weinheim, Basle, Cambridge, N.Y., Tokyo, 1996; and also EP-A-157106, EP-A-244855, EP-A-0007590, U.S. Pat. Nos. 6,300,430, 3,627,838, DE-A-2515805, DE-A-3141507) for direct free-radical high-pressure copolymerization of unsaturated compounds.

The polymers are prepared preferably in stirred high-pressure autoclaves or, more preferably, in high-pressure tubular reactors or combinations of the two. In the autoclaves, the length/diameter ratio varies predominantly within ranges from 2:1 to 30:1, preferably from 5:1 to 20:1. The tubular reactors predominantly have a length/diameter ratio of >1000, preferably from 5000 to 30 000.

Suitable pressure conditions for the polymerization are from 1000 to 3000 bar, preferably from 1500 to 2000 bar. The reaction temperatures are, for example, in the range from 120 to 320° C., preferably in the range from 140 to 280° C., more preferably in the range from 140 to 250° C.

The regulators used to adjust the molecular weight of the copolymers are, for example, an aliphatic aldehyde or an aliphatic ketone of the general formula I

(I)

or mixtures thereof.

In this structure, the $R^a$ and $R^b$ radicals are the same or different and are selected from
  hydrogen;
  $C_1$-$C_6$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl; more preferably $C_1$-$C_4$-alkyl such as methyl, ethyl, n-propyl, isopropyl, n-butyl, isobutyl, sec-butyl and tert-butyl;
  $C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

The $R^a$ and $R^b$ radicals may also be bonded covalently to one another to form a 4- to 13-membered ring. For example, $R^a$ and $R^b$ together may form the following alkylene groups. —$(CH_2)_4$—, —$(CH_2)_5$—, —$(CH_2)_6$—, —$(CH_2)_7$—, —CH($CH_3$)—$CH_2$—$CH_2$—CH($CH_3$)— or —CH($CH_3$)—$CH_2$—$CH_2$—$CH_2$—CH($CH_3$)—.

The use of propionaldehyde or ethyl methyl ketone as a regulator is very particularly preferred.

Further very suitable regulators are unbranched aliphatic hydrocarbons, for example propane, or branched aliphatic hydrocarbons with tertiary hydrogen atoms, for example isobutane, isopentane, isooctane or isododecane (2,2,4,6,6-pentamethylheptane). The further additional regulators used may be higher olefins, for example propylene.

Mixtures of the above regulators with hydrogen or hydrogen alone are also likewise preferred.

The amount of regulator used corresponds to the amounts customary for the high-pressure polymerization process.

The starters used for the free-radical polymerization may be the customary free-radical initiators, for example organic peroxides, oxygen or azo compounds. Mixtures of a plurality of free-radical initiators are also suitable. The free-radical initiators used may, for example, be one or more peroxides selected from the following commercially available substances:

didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbo)cyclohexane as an isomer mixture, tert-butyl perisononanoate, 1,1-di(tert-butylperoxy)-3,3,5-trimethylcyclohexane, 1,1-di(tert-butylperoxy)cyclohexane, methyl isobutyl ketone peroxide, tert-butyl peroxyisopropylcarbonate, 2,2-di(tert-butylperoxy)butane, tert-butyl peroxyacetate, tert-butyl peroxypivalate or tert-amyl peroxypivalate;

tert-butyl peroxybenzoate, di-tert-amyl peroxide, dicumyl peroxide, the isomeric di(tert-butylperoxyisopropyl)benzenes, 2,5-dimethyl-2,5-di-tert-butylperoxyhexane, tert-butyl cumyl peroxide, 2,5-dimethyl-2,5-di(tert-butylperoxy)hex-3-yne, di-tert-butyl peroxide, 1,3-diisopropyl monohydroperoxide, cumene hydroperoxide or tert-butyl hydroperoxide;

or dimeric or trimeric ketone peroxides, as known, for example, from EP-A-0 813 550.

Particularly suitable peroxides are di-tert-butyl peroxide, tert-butyl peroxypivalate, tert-butyl peroxyisononanoate or tert-butyl peroxy-2-ethylhexanoate or mixtures thereof. An example of an azo compound is azobisisobutyronitrile "AIBN". The free-radical initiators are metered in amounts customary for polymerizations.

In a preferred method, the inventive polymers are prepared by passing the monomers M1, M2, M3, if appropriate M4 and if appropriate M5, individually or in a mixture, in the presence of the regulator, at a temperature in the range from about 120 to 160° C., for example of 140° C., preferably continuously, through a tubular reactor which is kept at a pressure in the range from about 1500 to 2000 bar, for example about 1700 bar. As a result of the continuous addition of initiator, which is generally dissolved in a suitable solvent, for example isododecane, the temperature in the reactor is kept at the desired reaction temperature, for example at from 200 to 250° C. as the maximum value. The polymer present in the effluent is then isolated in a conventional manner or recycled into the reactor together with unconverted reactants.

Modifications to this method are of course possible and can be undertaken by those skilled in the art without unacceptable effort. For example, the comonomers and the regulator can be metered separately to the reaction mixture, the reaction temperature can be varied during the process, to name just a few examples.

The polymers comprise the monomers M1, M2, M3, if appropriate M4 and if appropriate M5 essentially in random distribution. Owing to different polymerization rates under the given polymerization conditions, however, according to the selection of the individual monomers, gradient copolymers can also form. For instance, acrylates frequently polymerize more rapidly than vinyl acetate under the above-described reaction conditions, so as to give rise, for example, to polymers in which the acrylate concentration decreases along the main polymer chain, while vinyl acetate and ethylene are distributed essentially uniformly over the chain.

d) Fuel Oil Compositions

The polymers are preferably used as cold flow improvers. In particular, they serve to lower the CFPP value, the CP value and/or the PP value of fuel oils additized with them.

The above-described polymers are used alone or in combination with conventional cold flow improvers in amounts which are sufficient to show action as a cold flow improver in the additized fuel oil or lubricant.

According to the invention, fuel oils are preferably understood to mean fuels. Suitable fuels are gasoline fuels and especially middle distillates, such as diesel fuels including marine diesel fuels, heating oil or kerosene, particular preference being given to diesel fuel and heating oil.

The heating oils are, for example, low-sulfur or sulfur-rich mineral oil raffinates or else hard coal or brown coal distillates which preferably have a boiling range of from 150 to 400° C. The heating oils are preferably those having a sulfur content of at most 1% by weight, preferably of at most 0.1% by weight. Examples of heating oil include especially heating oil for domestic oil-fired boilers or EL heating oil. The quality requirements for such heating oils are stated, for example, in DIN 51-603-1 (see also Ullmann's Encyclopedia of Industrial Chemistry, 5th Edition, Vol. A12, p. 617 ff., which is hereby explicitly incorporated by reference).

The diesel fuels are, for example, mineral oil raffinates which typically have a boiling range of from 100 to 400° C. These are usually distillates having a 95% point up to 360° C. or even higher. They may, however, also be "ultra low sulfur diesel" or "city diesel", characterized by a 95% point of, for example, not more than 345° C. and a sulfur content of not more than 0.005% by weight, or by a 95% point of, for example, 285° C. and a sulfur content of not more than 0.001% by weight.

The fuel oils used may also be marine diesel fuels ("ship's diesel") having a sulfur content of up to 4% by weight.

In addition to the diesel fuels obtainable by refining, those which are obtainable by coal gasification ("coal-to-liquid" (CTL) fuels), gas liquefaction ("gas to liquid" (GTL) fuels) or liquefaction of biomass ("biomass to liquid" (BTL) fuels) are suitable. BTL fuels also belong to the renewable fuels.

Also suitable are renewable fuels such as pure vegetable oils, tall oil fatty acids, biodiesel, bioethanol or BTL fuels, mixtures thereof or mixtures of the renewable fuels with the aforementioned diesel fuels or gasoline fuels.

Biodiesel is generally understood to mean the lower alkyl esters of vegetable oils (or else of animal fats), i.e. their $C_1$-$C_4$-alkyl esters, especially their ethyl or methyl esters and specifically their methyl esters. Biodiesel is also referred to as FAME (FAME=fatty acid methyl ester), rapeseed oil methyl ester (RME) being one of the most well-known FAME fuels. Biodiesel is used as such or in particular in a mixture with mineral diesel fuel.

In contrast to FAMEs, pure vegetable oils are untransesterified fatty acid esters which occur naturally in plants (more specifically. in their oily fruits). They are present in that ester form as occurs in the plant (more specifically. oily fruit), i.e. usually as the triglyceride. In principle, virtually all vegetable oils are suitable; however, rapeseed oil, soybean oil and palm oil are the most widespread.

Bioethanol is produced on the industrial scale by fermenting starch- and sugar-containing plants (sugarcane, cereal, etc.) and is used as such or in a mixture with gasoline fuels (benzines).

Unlike the production of biodiesel and bioethanol, the production of BTL utilizes not only the energy of the fruits but of the entire plant. Virtually any biomass is usable, for example wood chippings, waste wood and thinning wood, cereal, straw, etc.

In a particular embodiment of the invention, the fuel oil to be additized in accordance with the invention is a middle distillate which comprises from 1 to 100% by weight, preferably from 5 to 100% by weight, more preferably from 5 to 50% by weight and especially from 5 to 20% by weight, based on the total weight of the middle distillate, of GTL fuel, BTL fuel, FAME and/or pure vegetable oil, preferably GTL fuel, BTL fuel and/or FAME.

Particular preference is given to using the polymer used in accordance with the invention to additize diesel fuels with a low sulfur content, i.e. with a sulfur content of less than 0.05% by weight, preferably of less than 0.02% by weight, especially of less than 0.005% by weight and specifically of less than 0.001% by weight of sulfur, or for additizing heating oil having a low sulfur content, for example having a sulfur content of at most 0.1% by weight, preferably of at most 0.05% by weight, for example at most 0.005% by weight or, for example, at most 0.001% by weight.

The polymer used in accordance with the invention is preferably used in a quantitative proportion, based on the total amount of the fuel oil composition, which, viewed alone, possesses an essentially sufficient influence on the cold flow properties of the fuel oil compositions. The additive is preferably used in an amount of from 0.001 to 1% by weight, more preferably from 0.005 to 0.15% by weight, especially from 0.005 to 0.1% by weight, specifically from 0.01 to 0.05% by weight, based on the total amount of the fuel oil composition.

e) Lubricant Compositions

The invention further provides lubricant compositions comprising a major proportion by weight of a conventional lubricant and a minor proportion by weight of at least one polymer as defined above and if appropriate customary lubricant additives.

f) Coadditives

The inventive polymers may be added to the fuel oil compositions individually or as a mixture of such polymers and if appropriate in combination with further additives known per se.

Suitable additives which may be present in inventive fuel oils as well as the inventive polymer, especially for diesel fuels and heating oils, comprise detergents, corrosion inhibitors, dehazers, demulsifiers, foam inhibitors ("antifoams"), antioxidants, metal deactivators, polyfunctional stabilizers, cetane number improvers, combustion improvers, dyes, markers, solubilizers, antistats, lubricity improvers, and further additives which improve the cold properties of the fuel, such as nucleators, further conventional flow improvers ("MDFIs"), paraffin dispersants ("WASAs") and the combination of the last two additives mentioned ("WAFIs") (cf. also Ullmann's Encyclopedia of Industrial Chemistry, 5th Edition, Vol. A16, p. 719 ff; or the patents regarding flow improvers cited at the outset).

The further conventional cold flow improvers include especially:
(a) copolymers of ethylene with at least one further ethylenically unsaturated monomer which are different from the polymers used in accordance with the invention;
(b) comb polymers;
(c) polyoxyalkylenes;
(d) polar nitrogen compounds;
(e) sulfocarboxylic acids or sulfonic acids or their derivatives;
(f) poly(meth)acrylic esters;
(g) reaction products of alkanolamines with acylating agents;
(h) condensation products of hydroxyaromatics with aldehydes; and
(i) waxes.

In the copolymers of ethylene with at least one further ethylenically unsaturated monomer (a), the monomer is preferably selected from alkenyl carboxylates, (meth)acrylic esters and olefins.

Suitable olefins are, for example, those having from 3 to 10 carbon atoms and having from 1 to 3, preferably having 1 or 2, carbon-carbon double bonds, in particular having one carbon-carbon double bond. In the latter case, the carbon-carbon double bond may either be terminal α-olefins) or internal. However, preference is given to α-olefins, particular preference to α-olefins having from 3 to 6 carbon atoms, such as propene, 1-butene, 1-pentene and 1-hexene.

Suitable (meth)acrylic esters are, for example, esters of (meth)acrylic acid with $C_1$-$C_{10}$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol.

Suitable alkenyl carboxylates are, for example, the vinyl and propenyl esters of carboxylic acids having from 2 to 20 carbon atoms, whose hydrocarbon radical may be linear or branched. Among these, preference is given to the vinyl esters. Among the carboxylic acids having branched hydrocarbon radicals, preference is given to those whose branch is disposed in the α-position to the carboxyl group, and particular preference is given to the α-carbon atom being tertiary, i.e. to the carboxylic acid being a necarboxylic acid. However, the carboxylic acid radical of the carboxylic acid is preferably linear.

Examples of suitable alkenyl carboxylates are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, preference being given to the vinyl esters. A particularly preferred alkenyl carboxylate is vinyl acetate.

Particular preference is given to selecting the ethylenically unsaturated monomer from alkenyl carboxylates.

Also suitable are copolymers which comprise, in copolymerized form, two or more different alkenyl carboxylates which differ in the alkenyl function and/or in the carboxylic acid group. Likewise suitable are copolymers which, in addition to the alkenyl carboxylate(s), comprise at least one copolymerized olefin and/or at least one copolymerized (meth)acrylic ester.

The ethylenically unsaturated monomer is copolymerized in the copolymer in an amount of preferably from 1 to 50 mol %, more preferably from 10 to 50 mol % and in particular from 5 to 20 mol %, based on the overall copolymer.

The copolymer (a) preferably has a number-average molecular weight $M_n$ of from 1000 to 20 000, more preferably from 1000 to 10 000 and in particular from 1000 to 6000. Comb polymers (b) are, for example, those described in "Comb-Like Polymers, Structure and Properties", N. A. Platé and V. P. Shibaev, J. Poly. Sci. Macromolecular Revs. 8, pages 117 to 253 (1974). Among those described there, suitable comb polymers are, for example, those of the formula II

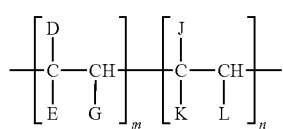
(II)

in which
D is $R^{17}$, $COOR^{17}$, $OCOR^{17}$, $R^{18}$, $OCOR^{17}$ or $OR^{17}$,
E is H, $CH_3$, D or $R^{18}$,
G is H or D,
J is H, $R^{18}$, $R^{18}COOR^{17}$, aryl or heterocyclyl,
K is H, $COOR^{18}$, $OCOR^{18}$, $OR^{18}$ or COOH,
L is H, $R^{18}$, $COOR^{18}$, $OCOR^{18}$, COOH or aryl,
where
$R^{17}$ is a hydrocarbon radical having at least 10 carbon atoms, preferably having from 10 to 30 carbon atoms,
$R^{18}$ is a hydrocarbon radical having at least one carbon atom, preferably having from 1 to 30 carbon atoms,
m is a quantitative proportion (molar fraction) in the range from 1.0 to 0.4 and
n is a quantitative proportion (molar fraction) in the range from 0 to 0.6.

Preferred comb polymers are obtainable, for example, by copolymerization of maleic anhydride or fumaric acid with another ethylenically unsaturated monomer, for example with an α-olefin or an unsaturated ester, such as vinyl acetate, and subsequent esterification of the anhydride or acid function with an alcohol having at least 10 carbon atoms. Further preferred comb polymers are copolymers of α-olefins and esterified comonomers, for example esterified copolymers of styrene and maleic anhydride or esterified copolymers of styrene and fumaric acid. Also suitable are mixtures of comb polymers. Comb polymers may also be polyfumarates or polymaleates. Homo- and copolymers of vinyl ethers are also suitable comb polymers.

Suitable polyoxyalkylenes (c) are, for example polyoxyalkylene esters, ethers, ester/ethers and mixtures thereof. The polyoxyalkylene compounds preferably comprise at least one, more preferably at least two, linear alkyl group(s) having from 10 to 30 carbon atoms and a polyoxyalkylene group having a molecular weight of up to 5000. The alkyl group of the polyoxyalkylene radical preferably comprises from 1 to 4 carbon atoms. Such polyoxyalkylene compounds are described, for example, in EP-A-0 061 895 and in U.S. Pat. No. 4,491,455, which are hereby fully incorporated by reference. Preferred polyoxyalkylene esters, ethers and ester/ethers have the general formula III

(III)

in which
$R^{19}$ and $R^{20}$ are each independently $R^{21}$, $R^{21}$—CO—, $R^{21}$—O—$CO(CH_2)_z$— or $R^{21}$—O—$CO(CH_2)_z$—CO—, where
$R^{21}$ is linear $C_1$-$C_{30}$-alkyl,
y is from 1 to 4,
x is from 2 to 200, and
z is from 1 to 4.

Preferred polyoxyalkylene compounds of the formula III in which both $R^{19}$ and $R^{20}$ are $R^{21}$ are polyethylene glycols and polypropylene glycols having a number-average molecular weight of from 100 to 5000. Preferred polyoxyalkylenes of the formula III in which one of the $R^{19}$ radicals is $R^{21}$ and the other is $R^{21}$—CO— are polyoxyalkylene esters of fatty acids having from 10 to 30 carbon atoms, such as stearic acid or behenic acid. Preferred polyoxyalkylene compounds in which both $R^{19}$ and $R^{20}$ are an $R^{21}$—CO— radical are diesters of fatty acids having from 10 to 30 carbon atoms, preferably of stearic acid or behenic acid.

The polar nitrogen compounds (d), which are advantageously oil-soluble, may be either ionic or nonionic and preferably have at least one, more preferably at least 2, substituent(s) of the formula >$NR^{22}$ in which $R^{22}$ is a $C_8$-$C_{40}$-hydrocarbon radical. The nitrogen substituents may also be quaternized, i.e. be in cationic form. One example of such nitrogen compounds is that of ammonium salts and/or amides which are obtainable by the reaction of at least one amine substituted with at least one hydrocarbon radical with a carboxylic acid having from 1 to 4 carboxyl groups or with a suitable derivative thereof. The amines preferably comprise at least one linear $C_8$-$C_{40}$-alkyl radical. Suitable primary amines are, for example, octylamine, nonylamine, decylamine, undecylamine, dodecylamine, tetradecylamine and the higher linear homologs. Suitable secondary amines are, for example, dioctadecylamine and methylbehenylamine. Also suitable are amine mixtures, in particular amine mixtures obtainable on the industrial scale, such as fatty amines or hydrogenated tallamines, as described, for example, in Ullmann's Encyclopedia of Industrial Chemistry, 6th edition, 2000 electronic release, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalenedicarboxylic acid, phthalic acid, isophthalic acid, terephthalic acid and succinic acids substituted with long-chain hydrocarbon radicals.

A further example of polar nitrogen compounds is that of ring systems which bear at least two substituents of the formula -A-$NR^{23}R^{24}$ in which A is a linear or branched aliphatic hydrocarbon group which is optionally interrupted by one or more groups selected from O, S, $NR^{35}$ and CO, and $R^{23}$ and $R^{24}$ are each a $C_9$-$C_{40}$-hydrocarbon radical which is optionally interrupted by one or more groups selected from O, S, $NR^{35}$ and CO, and/or substituted by one or more substituents selected from OH, SH and $NR^{35}R^{36}$ where $R^{35}$ is $C_1$-$C_{40}$-alkyl which is optionally substituted by one or more moieties selected from CO, $NR^{35}$, O and S, and/or substituted by one or more radicals selected from $NR^{37}R^{38}$, $OR^{37}$, $SR^{37}$, $COR^{37}$, $COOR^{37}$, $CONR^{37}R^{38}$, aryl or heterocyclyl, where $R^{37}$ and $R^{38}$ are each independently selected from H or $C_1$-$C_4$-alkyl; and $R^{36}$ is H or $R^{35}$.

A is preferably a methylene or polymethylene group having from 2 to 20 methylene units. Examples of suitable $R^{23}$ and $R^{24}$ radicals are 2-hydroxyethyl, 3-hydroxypropyl, 4-hydroxybutyl, 2-ketopropyl, ethoxyethyl and propoxypropyl. The cyclic system may be homocyclic, heterocyclic, fused polycyclic or nonfused polycyclic systems. The ring system is preferably carbo- or heteroaromatic, in particular carboaromatic. Examples of such polycyclic ring systems are fused benzoid structures such as naphthalene, anthracene, phenanthrene and pyrene, fused nonbenzoid structures such as azulene, indene, hydrindene and fluorene, nonfused polycycles such as diphenyl, heterocycles such as quinoline, indole, dihydroindole, benzofuran, coumarin, isocoumarin, benzothiophene, carbazole, diphenylene oxide and diphenylene sulfide, nonaromatic or partly saturated ring systems such as decalin, and three-dimensional structures such as α-pinene, camphene, bornylene, norbornane, norbornene, bicyclooctane and bicyclooctene.

A further example of suitable polar nitrogen compounds is that of condensates of long-chain primary or secondary amines with carboxyl group-comprising polymers.

The polar nitrogen compounds mentioned here are described in WO 00/44857 and also in the references cited therein, which are hereby fully incorporated by reference.

Suitable polar nitrogen compounds are also described, for example, in DE-A-198 48 621 and DE-A-196 22 052 or EP-B 398 101, which are hereby incorporated by reference.

Suitable sulfocarboxylic acids/sulfonic acids or their derivatives (e) are, for example, those of the general formula IV

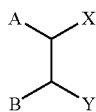
(IV)

in which
Y is $SO_3^-(NR^{25}_3R^{26})^+$, $SO_3^-(NHR^{25}_2R^{26})^+$, $SO_3^-(NH_2R^{25}R^{26})$, $SO_3^-(NH_3R^{26})$ or $SO_2NR^{25}R^{26}$,
X is Y, $CONR^{25}R^{27}$, $CO_2^-(NR^{25}_3R^{27})^+$, $CO_2^-(NHR^{25}_2R^{27})^+$, $R^{28}$—$COOR^{27}$, $NR^{25}COR^{27}$, $R^{28}OR^{27}$, $R^{28}OCOR^{27}$, $R^{28}R^{27}$, $N(COR^{25})R^{27}$ or $Z^-(NR^{25}_3R^{27})$,
where
$R^{25}$ is a hydrocarbon radical,
$R^{26}$ and $R^{27}$ are each alkyl, alkoxyalkyl or polyalkoxyalkyl having at least 10 carbon atoms in the main chain,
$R^{28}$ is $C_2$-$C_5$-alkylene,
$Z^-$ is one anion equivalent and
A and B are each alkyl, alkenyl or two substituted hydrocarbon radicals or, together with the carbon atoms to which they are bonded, form an aromatic or cycloaliphatic ring system.

Such sulfocarboxylic acids and sulfonic acids and their derivatives are described in EP-A-0 261 957, which is hereby fully incorporated by reference.

Suitable poly(meth)acrylic esters (f) are either homo- or copolymers of acrylic and methacrylic esters. Preference is given to acrylic ester homopolymers which derive from $C_1$-$C_{40}$-alcohols. Preference is given to copolymers of at least two different (meth)acrylic esters which differ in the esterified alcohol. If appropriate, the copolymer comprises a further, different copolymerized olefinically unsaturated monomer. The weight-average molecular weight of the polymer is preferably from 50 000 to 500 000. A particularly preferred polymer is a copolymer of methacrylic acid and methacrylic esters of saturated $C_{14}$- and $C_{15}$-alcohols, in which the acid groups have been neutralized with hydrogenated tallamine. Suitable poly(meth)acrylic esters are described, for example, in WO 00/44857, which is fully incorporated herein by way of reference.

To prepare suitable reaction products of alkanolamines with acylating agents (g), the acylating agents used are preferably those which comprise a hydrocarbon radical having from 8 to 50 carbon atoms. Examples thereof are succinic acids or succinic acid derivatives substituted by $C_8$-$C_{50}$-alkyl or alkenyl radical, preferably $C_{12}$-$C_{35}$-alkyl or alkenyl radical. The alkanolamines are, for example, diethanolamine, dipropanolamine, dibutanolamine, N-methylethanolamine or N-ethylethanolamine. Such compounds are described, for example, in WO 01/62874, which is hereby incorporated by reference.

The hydroxyaromatics used to prepare the condensation products of hydroxyaromatics with aldehydes (h) are those which are substituted by a linear or branched hydrocarbon radical. The hydroxyaromatic may either be a substituted phenol or any other hydroxy-containing aromatic such as naphthol. The aldehyde component used may either be the aldehydes themselves or suitable aldehyde sources. Examples of suitable aldehydes are formaldehyde (which may be used, for example, as paraldehyde or trioxane), acetaldehyde, propanal, butanal, isobutyraldehyde, heptanal, 2-ethylhexanal and glyoxalic acid. Suitable condensation products are described, for example, in WO 01/62874 or in EP-A-1357168, which are hereby incorporated by reference.

Suitable waxes (i) are both linear and nonlinear paraffins. The n-paraffins are preferably $C_8$-$C_{35}$-alkanes, more preferably $C_8$-$C_{30}$-alkanes and in particular $C_8$-$C_{25}$-alkanes. The nonlinear paraffins comprise preferably amorphous solids having a melting point of from 10 to 60° C. and a molecular weight of from 150 to 500. Such waxes are described, for example, in EP-A-1357168, which is hereby incorporated by reference.

Preferred coadditives are in particular those of group (a), among which particular preference is given to ethylene/vinyl acetate copolymers.

g) Additive Packages

The present application finally provides an additive package which, in addition to at least one polymer to be used in accordance with the invention as defined above, comprises at least one further fuel additive and/or at least one diluent.

Suitable further fuel additives (coadditives) are those specified above.

Suitable diluents are, for example, fractions obtained in mineral oil processing, such as kerosene, naphtha or brightstock. Additionally suitable are aromatic and aliphatic hydrocarbons and alkoxyalkanols. Diluents used with preference in the case of middle distillates, especially in the case of diesel fuels and heating oils, are naphtha, kerosene, diesel fuels, aromatic hydrocarbons such as Solvent Naphtha heavy, Solvesso® or Shellsol®, and mixtures of these solvents and diluents.

Suitable diluents are, for example, fractions obtained in mineral oil processing, such as kerosene, naphtha or brightstock. Additionally suitable are aromatic and aliphatic hydrocarbons and alkoxyalkanols. Diluents used with preference in the case of middle distillates, especially in the case of diesel fuels and heating oils, are naphtha, kerosene, diesel fuels, aromatic hydrocarbons such as Solvent Naphtha heavy, Solvesso® or Shellsol®, and mixtures of these solvents and diluents.

In the additive packages, the polymer used in accordance with the invention is present in an amount of preferably from 0.1 to 99% by weight, more preferably from 1 to 95% by weight and especially from 5 to 90% by weight.

When the additive package comprises a diluent, the polymer used in accordance with the invention is present in the concentrates preferably in an amount of from 0.1 to 90% by weight, more preferably from 1 to 80% by weight and especially from 5 to 75% by weight, based on the total weight of the concentrate.

As a result of the use of the polymers to be used in accordance with the invention, the cold flow properties of fuel oils additized with them, in particular of middle distillates, are significantly improved. In particular, the PP (pour point) and/or the CFPP (cold filter plugging point) are lowered significantly. Moreover, the polymers to be used in accordance with the invention feature particularly good handling properties. In particular, the polymers to be used in accordance with the invention can be mixed into the fuel oil to be additized at significantly lower temperatures than comparable prior art cold flow improvers.

The invention will now be illustrated in detail with reference to the following nonrestrictive examples.

EXPERIMENTAL PART a) Preparation Examples 1 to 18

A total of 18 different polymers to be used in accordance with the invention were prepared by high-pressure polymerization of ethylene, vinyl acetate and a mixture of 2-propylheptyl acrylate and 4-methyl-2-propylhexyl acrylate in a weight ratio of about 9:1 (polymers 1 to 10), or of ethylene, vinyl acetate, 2-ethylhexyl acrylate and a mixture of 2-propylheptyl acrylate and 4-methyl-2-propylhexyl acrylate in a weight ratio of about 9:1 (polymers 11 and 12), or of ethylene, vinyl acetate, 2-ethylhexyl acrylate and a mixture of lauryl acrylate and myristyl acrylate in a weight ratio of about 55:45 (polymers 13 to 17) or of ethylene, vinyl acetate, 2-ethylhexyl acrylate and vinyl laurate (polymer 18).

In table 1, the properties of the polymers used in the test examples which follow are compiled.

The monomer content in the resulting polymers was determined by NMR spectroscopy. The ethylene content constitutes the difference from 100% by weight. The viscosities were determined according to Ubbelohde DIN 51562 at 120° C.

TABLE 1

| Polymer No. | VAC [% by wt.] | M3 [% by wt.] | M4 [% by wt.] | Viscosity [mm$^2$/s] | $M_n$ | $M_w/M_n$ |
|---|---|---|---|---|---|---|
| 1 | 25.1 | 13.7[1] | — | 148 | 2798 | 2.26 |
| 2 | 25.1 | 12.3[1] | — | 62 | 2109 | 2.03 |
| 3 | 25.1 | 12.3[1] | — | 300 | 3443 | 2.38 |
| 4 | 22.0 | 9.5[1] | — | 148 | 2839 | 2.20 |
| 5 | 22.8 | 9.3[1] | — | 65 | 2054 | 2.02 |
| 6 | 21.4 | 12.2[1] | — | 155 | 2913 | 2.20 |
| 7 | 23.3 | 13.0[1] | — | 100 | 2441 | 2.08 |
| 8 | 24.3 | 13.7[1] | — | 150 | 3114 | 1.99 |
| 9 | 24.3 | 14.4[1] | — | 150 | 2868 | 2.27 |
| 10 | 16.9 | 23.7[1] | — | 210 | 3302 | 2.36 |
| 11 | 23.6 | 5.5[2] 6.5[1] | — | 150 | 2831 | 2.23 |
| 12 | 23.6 | 5.5[2] 6.5[1] | — | 310 | 3638 | 2.33 |
| 13 | 24.1 | 7.6[2] 5.5[3] | — | 150 | 2668 | 2.43 |
| 14 | 24.1 | 5.7[2] 7.1[3] | — | 70 | 2282 | 1.99 |
| 15 | 24.1 | 5.7[2] 7.1[3] | — | 160 | 2859 | 2.35 |
| 16 | 24.1 | 5.7[2] 7.1[3] | — | 300 | 3698 | 2.49 |
| 17 | 24.1 | 3.8[2] 9.1[3] | — | 150 | 3077 | 2.22 |
| 18 | 22.0 | 13[2] | 5[4] | 300 | 3213 | 2.98 |

VAC: Vinyl acetate
[1]Mixture of 90% by weight of 2-propylheptyl acrylate and 10% by weight of 4-methyl-2-propylhexyl acrylate
[2]2-Ethylhexyl acrylate
[3]Mixture of 55% by weight of lauryl acrylate and 45% by weight of myristyl acrylate
[4]Vinyl laurate

2. Test Examples

The above polymers were used to prepare 50% or 60% polymer solutions in Solvent Naphtha (i.e. 50% by weight of polymer+50% by weight of Solvent Naphtha or 60% by weight of polymer+40% by weight of Solvent Naphtha). These polymer solutions 1 to 18 were used to perform the following tests. For comparative purposes, the following conventional MDFIs were also tested:

Comparative product A. Ethylene-vinyl acetate-based polymer mixture; 60% polymer content (BASF AG)
Comparative product B. Ethylene-vinyl acetate-based polymer mixture; 50% polymer content (BASF AG)
Comparative product C. Ethylene/vinyl acetate/2-ethylhexyl acrylate copolymer; 60% polymer content
Comparative product D. Ethylene/vinyl acetate/2-ethylhexyl acrylate copolymer; 50% polymer content Conventional middle distillate fuels were additized with the above inventive or conventional cold flow improvers in different dosages, and the minimum mixing temperature and the CFPP (cold filter plugging point) of the additized fuels were determined. Also determined were the CP (cloud point) and the PP (pour point) of the cold flow improvers. The CP was determined to ASTM D 2500, the PP to ASTM D 97 and the CFPP to DIN EN 116.

The minimum mixing temperature was determined by a modified SEDAB filtration test:

To this end, a stainless steel vacuum filtration unit (SM 16201 from Sartorius) with a 500 ml filter cup, a 1000 ml suction bottle and a membrane filter (11304 from Sartorius; diameter 50 mm, pore width 0.8 μm; dried at 90° C. for 30 min and stored dry) was used.

To remove water, soil and coke constituents, the fuel oil is prefiltered through a fluted filter. 500 ml per test of the prefiltered and unadditized fuel oil are filled into a 1000 ml mixing cylinder and brought to the temperature to be examined. The heated fuel oil is admixed with the undiluted MDFI at 40° C. (500 ppm) and homogenized immediately by gently tilting the mixing cylinder ten times. The membrane filter is placed by the top side of the filter into the filtration unit and the pressure is adjusted to 200 mbar with the tap closed. The filter cup attached is filled with the homogenized sample (500 ml). The tap is opened and the filtration time is determined.

Samples which are completely filterable within 120 s are considered to be a "PASS"; the filtration time at the given temperature is recorded. Samples for which the filtration time is more than 120 s are considered to be a "FAIL"; the residual volume still present in the filter cup after 120 s is determined. In the case of such samples, the temperature of the fuel oil is increased by 5° C. and the filtration time is determined again. The temperature increase by 5° C. each time is repeated until the sample is completely filterable within 120 s; the filtration time at the corresponding temperature is recorded. Conversely, in the case of samples which are completely filterable within 120 s, the temperature of the fuel oil is lowered successively by 5° C. each time until the sample is no longer completely filterable within 120 s.

Test Example 2.1

Minimum Mixing Temperature of the Additives

The minimum mixing temperature in the middle distillate was examined by using 50% solutions of the polymers used in accordance with the invention in Solvent Naphtha or the above-specified comparative products heated to 40° C. The minimum mixing temperature is important especially for those refineries which mix additives unheated into fuel oils or mix additives into unheated fuel oils. When the minimum mixing temperature of the additive is high, there may be filter problems after the unheated mixing.

Middle distillate used. diesel fuel, CP=−12.2° C., CFPP=−13° C., density 835.5 kg/m³, IBP=206° C., FBP=343° C., 22.6% n-paraffins, 90−20=74° C.

Dosage of the additives. 500 ppm of the polymer solution

TABLE 2

| Additive | Minimum mixing temperature [° C.] | Passage time [s] | Residual volume [ml] |
|---|---|---|---|
| No additive | 10 | 74 | — |
| Polymer solution No. 2 | 20 | 70 | — |
| Polymer solution No. 3 | 20 | 71 | — |
| Polymer solution No. 13 | 20 | 116 | — |
| Polymer solution No. 14 | 10 | 78 | — |
| Polymer solution No. 15 | 10 | 91 | — |
| Polymer solution No. 15 | 20 | 78 | — |
| Polymer solution No. 16 | 10 | 111 | — |
| Polymer solution No. 17 | 20 | 97 | — |
| Comparative product A | 20 | >120 | 240 |
| Comparative product B | 35 | 106 | — |
| Comparative product C | 20 | >120 | 180 |
| Comparative product D | 35 | 72 | — |

As the above results show, the polymers used in accordance with the invention in the 50% solution have a significantly lower minimum mixing temperature than the solution of the conventional additives.

Test Example 2.2

Cloud Point (CP)

The CP was determined to ASTM D 2500 by using 60% solutions of the inventive polymers in Solvent Naphtha or the above-specified comparative products.

TABLE 3

| Additive | CP [° C.] |
|---|---|
| Polymer solution No. 1 | 45 |
| Polymer solution No. 3 | 46 |
| Polymer solution No. 7 | 40 |
| Polymer solution No. 8 | 44 |
| Polymer solution No. 9 | 35 |
| Polymer solution No. 10 | 35 |
| Polymer solution No. 11 | 48 |
| Polymer solution No. 12 | 43 |
| Polymer solution No. 13 | 29 |
| Polymer solution No. 14 | 29 |
| Polymer solution No. 15 | 27 |
| Polymer solution No. 16 | 31 |
| Polymer solution No. 17 | 30 |
| Polymer solution No. 18 | 29 |
| Comparative product A | 55 |
| Comparative product C | 50 |

As the above results show, the inventive additives in the 60% solution have a significantly lower CP than the solution of the conventional additives.

Test Example 2.3

Pour Point (PP)

The PP of the additives was determined to ASTM D 2500 by using 60% solutions of the polymers in Solvent Naphtha or the above-specified comparative products. The pour point of the additives plays an important role for the handling in the course of mixing into the fuel oil. A very low PP enables the convenient handling of the additives in the course of mixing-in even at low temperatures and saves heating costs for additive tanks.

TABLE 4

| Additive | PP [° C.] |
|---|---|
| Polymer solution No. 1 | 0 |
| Polymer solution No. 2 | 6 |
| Polymer solution No. 3 | 12 |
| Polymer solution No. 4 | 6 |
| Polymer solution No. 5 | 9 |
| Polymer solution No. 6 | 15 |
| Polymer solution No. 7 | 12 |
| Polymer solution No. 8 | 3 |
| Polymer solution No. 9 | 3 |
| Polymer solution No. 10 | 12 |
| Polymer solution No. 11 | 9 |
| Polymer solution No. 12 | 15 |
| Polymer solution No. 13 | 0 |
| Polymer solution No. 14 | 9 |
| Polymer solution No. 15 | 3 |
| Polymer solution No. 16 | 9 |
| Polymer solution No. 17 | 3 |
| Polymer solution No. 18 | 6 |
| Comparative product A | 24 |
| Comparative product B | 18 |
| Comparative product C | 30 |

As the above results show, the inventive additives in the 60% solution have a significantly lower pour point than the solution of the conventional additives.

Test Example 2.4

Improvement in the Cold Flow Properties of Middle Distillates (CFPP)

50% polymer solutions (50% by weight of polymer) were used.

Example a

Middle distillate used. heating oil, CP=10.1° C., CFPP=7° C., density 861.5 kg/m³, IBP=181° C., FBP=391° C., 90−20=95° C., 21% n-paraffins, 28% aromatics.

Dosage of the additives. 1000 ppm of the polymer solution

TABLE 5

| Additive | CFPP [° C.] |
|---|---|
| Comparative product A | 6 |
| Comparative product B | 2 |
| Comparative product C | 7 |
| Polymer solution No. 1 | 0 |
| Polymer solution No. 3 | −4 |
| Polymer solution No. 4 | −4 |
| Polymer solution No. 5 | −4 |
| Polymer solution No. 6 | −6 |
| Polymer solution No. 7 | −3 |
| Polymer solution No. 8 | −6 |
| Polymer solution No. 9 | −6 |
| Polymer solution No. 10 | −4 |
| Polymer solution No. 12 | −3 |
| Polymer solution No. 13 | −7 |
| Polymer solution No. 14 | −5 |
| Polymer solution No. 15 | −7 |
| Polymer solution No. 16 | −4 |
| Polymer solution No. 17 | −7 |
| Polymer solution No. 18 | −8 |

Example b

Middle distillate used. diesel fuel, CP=5° C., CFPP=2° C., density 826.4 kg/m³, IBP=180° C., FBP=373° C., 90–20=106° C., 28% n-paraffins, 20% aromatics.

Dosage of the additives. 400 ppm of the polymer solution

TABLE 6

| Additive | CFPP [° C.] |
| --- | --- |
| Comparative product A | −4 |
| Comparative product B | −6 |
| Comparative product C | −6 |
| Comparative product D | −6 |
| Polymer solution No. 1 | −8 |
| Polymer solution No. 3 | −8 |
| Polymer solution No. 4 | −8 |
| Polymer solution No. 6 | −9 |
| Polymer solution No. 7 | −9 |
| Polymer solution No. 9 | −8 |
| Polymer solution No. 10 | −8 |
| Polymer solution No. 11 | −8 |
| Polymer solution No. 13 | −8 |
| Polymer solution No. 15 | −8 |
| Polymer solution No. 17 | −8 |
| Polymer solution No. 18 | −8 |

Example c

Middle distillate used. heating oil, CP=0° C., CFPP=−1° C., density 858.9 kg/m³, IBP=167° C., FBP=377° C., 90–20=145° C., 18% n-paraffins, 39% aromatics.

Dosage of the additives. 350 ppm of the polymer solution

TABLE 7

| Additive | CFPP [° C.] |
| --- | --- |
| Comparative product A | −8 |
| Comparative product C | −10 |
| Comparative product D | −10 |
| Polymer solution No. 1 | −14 |
| Polymer solution No. 3 | −14 |
| Polymer solution No. 4 | −12 |
| Polymer solution No. 5 | −15 |
| Polymer solution No. 6 | −12 |
| Polymer solution No. 7 | −13 |
| Polymer solution No. 9 | −13 |
| Polymer solution No. 11 | −14 |
| Polymer solution No. 12 | −14 |
| Polymer solution No. 13 | −12 |
| Polymer solution No. 15 | −12 |
| Polymer solution No. 16 | −13 |

Example d

Middle distillate used. diesel fuel, CP=−8.5° C., CFPP=−9° C., density 830.5 kg/m³, IBP=165° C., FBP=342° C., 90–20=75° C., 22% n-paraffins.

Dosage of the additives. 1000 ppm of the polymer solution

TABLE 8

| Additive | CFPP [° C.] |
| --- | --- |
| Comparative product C | −16 |
| Comparative product D | −14 |
| Polymer solution No. 1 | −18 |
| Polymer solution No. 7 | −20 |
| Polymer solution No. 8 | −20 |
| Polymer solution No. 9 | −20 |

TABLE 8-continued

| Additive | CFPP [° C.] |
| --- | --- |
| Polymer solution No. 11 | −18 |
| Polymer solution No. 13 | −20 |
| Polymer solution No. 14 | −22 |
| Polymer solution No. 15 | −19 |
| Polymer solution No. 17 | −19 |

Example e

Middle distillate used. heating oil, CP=0.5° C., CFPP=0° C., density 861.1 kg/m³, IBP=176° C., FBP=372° C., 90–20=125° C., 17.8% n-paraffins.

Dosage of the additives. 350 ppm of the polymer solution

TABLE 9

| Additive | CFPP [° C.] |
| --- | --- |
| Comparative product A | −11 |
| Comparative product B | −12 |
| Comparative product D | −15 |
| Polymer solution No. 2 | −17 |
| Polymer solution No. 5 | −18 |
| Polymer solution No. 6 | −19 |
| Polymer solution No. 7 | −18 |
| Polymer solution No. 8 | −19 |
| Polymer solution No. 9 | −19 |
| Polymer solution No. 10 | −20 |
| Polymer solution No. 11 | −20 |
| Polymer solution No. 12 | −20 |
| Polymer solution No. 13 | −17 |
| Polymer solution No. 14 | −17 |
| Polymer solution No. 15 | −18 |
| Polymer solution No. 16 | −19 |
| Polymer solution No. 18 | −19 |

Example f

Middle distillate used. diesel fuel, CP=−5.9° C., CFPP=−9° C., density 837.3 kg/m³, IBP=178° C., FBP=364° C., 90–20=111° C., 16.6% n-paraffins; comprises 150 ppm of WASA.

Dosage of the additives. 100 ppm of the polymer solution

TABLE 10

| Additive | CFPP [° C.] |
| --- | --- |
| Comparative product C | −21 |
| Comparative product D | −21 |
| Polymer solution No. 1 | −27 |
| Polymer solution No. 3 | −27 |
| Polymer solution No. 4 | −26 |
| Polymer solution No. 5 | −27 |
| Polymer solution No. 6 | −27 |
| Polymer solution No. 7 | −26 |
| Polymer solution No. 8 | −27 |
| Polymer solution No. 9 | −26 |
| Polymer solution No. 11 | −27 |
| Polymer solution No. 12 | −27 |
| Polymer solution No. 13 | −26 |
| Polymer solution No. 14 | −25 |
| Polymer solution No. 15 | −26 |
| Polymer solution No. 16 | −25 |
| Polymer solution No. 17 | −27 |
| Polymer solution No. 18 | −25 |

The test results summarized in tables 5 to 10 demonstrate a surprisingly good performance of the polymers used in accordance with the invention as cold flow improvers in middle distillates. With the inventive additives, it is now firstly possible to establish comparable CFPP values to those with conventional MDFIs, but at a lower dosage, or to achieve improved CFPP values at the same dosage.

As test examples 2.1 to 2.3 show, the polymers used in accordance with the invention also enable better and more convenient handling, since they can be mixed in at lower temperatures and also have a lower pour point than conventional additives, such that they or the fuel oils have to be heated to a lesser degree, if at all, before the mixing-in.

The invention claimed is:

1. A method for improving the cold flow properties of fuel oils and lubricants, which comprises additizing a fuel oil or a lubricant with an effective amount of
    (B) a polymer B which is formed from monomers comprising at least one monomer of the formula M1, at least one monomer of the formula M2, and at least two monomers of the formula M3:

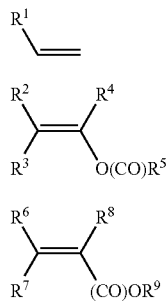

in which
$R^1$ is H or $C_1$-$C_{40}$-alkyl;
$R^2$, $R^3$ and $R^4$ are each independently H or $C_1$-$C_4$-alkyl;
$R^5$ is $C_1$-$C_{20}$-alkyl;
$R^6$, $R^7$ and $R^8$ are each independently H or $C_1$-$C_4$-alkyl;
$R^9$ is $C_4$-$C_{20}$-alkyl in the first monomer M3 and is $C_9$-$C_{20}$-alkyl in the second and in each further monomer M3, where the $R^9$ radicals in the different monomers M3 are different;
wherein $R^9$ in at least one monomer M3 is a branched alkyl radical and the molar ratio of monomers M3 with a branched alkyl $R^9$ radical to monomers M3 with a linear alkyl $R^9$ radical is from 1:5 to 1:0.

2. The method according to claim 1, wherein the monomers M1, M2, and M3, are present in the polymer in the following molar proportions:
M1: 0.60 to 0.97
M2: 0.02 to 0.25
M3: 0.01 to 0.15.

3. The method according to claim 1, wherein $R^9$ in the first monomer M3 is $C_6$-$C_{20}$-alkyl.

4. The method according to claim 1, with the proviso that the average number of carbon atoms of all $R^9$ radicals is from 8.5 to 20.

5. The method according to claim 1, with the proviso that the average number of carbon atoms of all $R^9$ radicals is from 9 to 20.

6. The method according to claim 1, wherein $R^9$ is $C_{10}$-$C_{16}$-alkyl.

7. The method according to claim 1, wherein $R^9$ in one of the monomers M3 is 2-propylheptyl.

8. The method according to claim 1, wherein $R^9$ in one of the monomers M3 is 2-ethylhexyl and $R^9$ in a second monomer M3 is 2-propylheptyl, lauryl or myristyl.

9. The method according to claim 1, wherein the polymer B comprises two monomers M3 of the formulae M3.1 and M3.2:

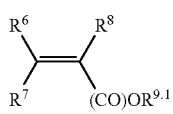

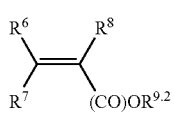

where each $R^6$, each $R^7$ and each $R^8$ is independently as defined in claim 1;
$R^{9.1}$ is $C_6$-$C_{20}$-alkyl; and
$R^{9.2}$ is $C_9$-$C_{20}$-alkyl;
with the proviso that the average number of carbon atoms of the $R^{9.1}$ and $R^{9.2}$ radicals is from 9 to 20 and that $R^{9.1}$ and $R^{9.2}$ are different.

10. The method according to claim 9, wherein $R^{9.1}$ is 2-propylhept-1-yl.

11. The method according to claim 9, wherein $R^{9.1}$ is 2-propylhept-1-yl and $R^{9.2}$ is a decyl isomer different therefrom.

12. The method according to claim 11, wherein $R^{9.2}$ is 4-methyl-2-propylhex-1-yl.

13. The method according to claim 9, wherein $R^{9.1}$ is 2-ethylhexyl and $R^{9.2}$ is 2-propylhept-1-yl.

14. The method according to claim 9, wherein the polymer B comprises a further monomer M3 of the formula M3.3:

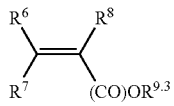

in which
$R^{9.3}$ is $C_9$-$C_{20}$-alkyl;
with the proviso that the average number of carbon atoms of the $R^{9.1}$, $R^{9.2}$ and $R^{9.3}$ radicals is from 9 to 20 and that $R^{9.1}$, $R^{9.2}$ and $R^{9.3}$ are different.

15. The method according to claim 14, wherein $R^{9.1}$ is 2-ethylhexyl, $R^{9.2}$ is 2-propylhept-1-yl and $R^{9.3}$ is a decyl isomer different therefrom, or $R^{9.2}$ is lauryl and $R^{9.3}$ is myristyl.

16. The method according to claim 1, wherein monomer M1 is ethylene.

17. The method according to claim 1, wherein $R^2$, $R^3$ and $R^4$ are each H or two of the $R^2$, $R^3$ and $R^4$ radicals are each H and the other radical is methyl.

18. The method according to claim 1, wherein $R^5$ is $C_1$-$C_4$-alkyl.

19. The method according to claim 17, wherein M2 is vinyl acetate.

20. The method according to claim 1, wherein the polymers B are selected from the group consisting of ethylene/vinyl acetate/2-propylheptyl acrylate copolymers, ethylene/vinyl acetate/2-propylheptyl acrylate/4-methyl-2-propylhexyl acrylate copolymers, ethylene/vinyl acetate/2-ethylhexyl acrylate/2-propylheptyl acrylate copolymers, ethylene/vinyl acetate/2-ethylhexyl acrylate/2-propylheptyl acrylate/4-methyl-2-propylhexyl acrylate copolymers, ethylene/vinyl acetate/2-ethylhexyl acrylate/lauryl acrylate copolymers, ethylene/vinyl acetate/2-ethylhexyl acrylate/lauryl acrylate/myristyl acrylate copolymers, ethylene/vinyl acetate/2-ethylhexyl acrylate/vinyl laurate copolymers and ethylene/vinyl acetate/2-ethylhexylacrylate/2-propylheptyl acrylate/4-methyl-2-propylhexyl acrylate/lauryl acrylate/myristyl acrylate copolymers.

21. The method according to claim 1, wherein the effective amount is an amount for lowering the CFPP value, the pour point of fuel oils, or a combination thereof.

22. A polymer which is formed from monomers comprising at least one monomer of the formula M1, at least one monomer of the formula M2, and at least two monomers of the formula M3:

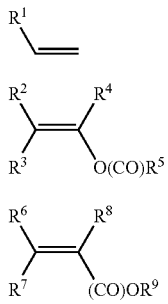

in which
$R^1$ is H or $C_1$-$C_{40}$-alkyl;
$R^2$, $R^3$ and $R^4$ are each independently H or $C_1$-$C_4$-alkyl;
$R^5$ is $C_1$-$C_{20}$-alkyl;
$R^6$, $R^7$ and $R^8$ are each independently H or $C_1$-$C_4$-alkyl;
$R^9$ is $C_4$-$C_{20}$-alkyl in the first monomer M3 and is $C_9$-$C_{20}$-alkyl in the second and in each further monomer M3, where the $R^9$ radicals in the different monomers M3 are different;
wherein $R^9$ in at least one monomer M3 is a branched alkyl radical and the molar ratio of monomers M3 with a branched alkyl $R^9$ radical to monomers M3 with a linear alkyl $R^9$ radical is from 1:5 to 1:0.

23. A fuel oil composition comprising a major proportion by weight of a middle distillate fuel which boils in the range of 120-500° C. and a minor proportion by weight of at least one polymer as defined in claim 1.

24. The fuel oil composition according to claim 23, wherein the fuel component comprises biodiesel (from animal or vegetable production), BTL diesel or GTL diesel in proportions of 1-100% by weight.

25. The fuel oil composition according to claim 23, wherein the fuel component comprises biodiesel (from animal or vegetable production), BTL diesel or GTL diesel in proportions of 1-20% by weight.

26. The fuel oil composition according to claim 23, selected from the group consisting of diesel fuels and heating oil.

27. The fuel oil composition according to claim 23, wherein the sulfur content of the mixture is at most 500 ppm.

28. A lubricant composition comprising a major proportion by weight of a conventional lubricant and a minor proportion by weight of at least one polymer as defined in claim 1.

29. The method according to claim 1, wherein the polymer is present in combination with at least one of a further conventional cold flow improver, a further lubricants and fuel oil additives.

30. An additive package comprising at least one polymer as defined in claim 1 in combination with at least one further conventional lubricant or fuel oil additive.

31. The method according to claim 1, wherein the polymer B is formed from monomers further comprising at least one monomer M4:

in which
each of $R^{10}$, $R^{11}$ and $R^{12}$ is independently H or $C_1$-$C_4$-alkyl; and
$R^{13}$ is $O(CO)R^{14}$ and
$R^{14}$ is $C_3$-$C_{19}$-alkyl.

32. The method according to claim 31, wherein the average number of carbon atoms in all $R^9$ and $R^{13}$ radicals is from 9 to 20.

33. The method according to claim 31, wherein $R^{14}$ is $C_9$-$C_{19}$-alkyl.

34. The method according to claim 31, wherein the monomers M1, M2, M3, and M4 are present in the polymer in the following molar proportions:
M1: 0.60 to 0.97
M2: 0.02 to 0.25
M3: 0.01 to 0.15
M4: 0.002 to 0.10.

35. The method according to claim 1, wherein the polymer B is formed from monomers further comprising at least one monomer M5:

in which
$R^{15}$ is H or $C_1$-$C_4$-alkyl;
$R^{17}$ is $OR^{19}$;
one of the $R^{16}$ and $R^{18}$ radicals is —(CO)$R^{20}$ and the other radical is H or $C_1$-$C_4$-alkyl;
$R^{20}$ is $OR^{21}$;
$R^{19}$ and $R^{21}$ are each independently H or $C_1$-$C_{20}$-alkyl; and
or $R^{17}$ and $R^{20}$ together form an —O— group.

36. The method according to claim 35, wherein the average number of carbon atoms in all $R^{19}$ and $R^{21}$ radicals is from 9 to 20.

37. The method according to claim 36, wherein the monomers M1, M2, M3, and M5 are present in the polymer in the following molar proportions:
M1: 0.60 to 0.97
M2: 0.02 to 0.25
M3: 0.01 to 0.15
M5: 0.001 to 0.02.

38. The method according to claim 1, wherein the polymer B is formed from monomers further comprising at least one monomer M4 and at least one monomer M5:

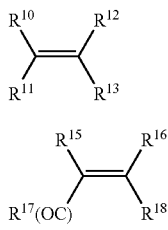 M4

M5 in which
each of $R^{10}$, $R^{11}$ and $R^{12}$ is independently H or $C_1$-$C_4$-alkyl;
$R^{13}$ is $O(CO)R^{14}$;
$R^{14}$ is $C_3$-$C_{19}$-alkyl;
$R^{15}$ is H or $C_1$-$C_4$-alkyl;
$R^{17}$ is $OR^{19}$;
one of the $R^{16}$ and $R^{18}$ radicals is —(CO)$R^{20}$ and the other radical is H or $C_1$-$C_4$-alkyl;
$R^{20}$ is $OR^{21}$;
$R^{19}$ and $R^{21}$ are each independently H or $C_1$-$C_{20}$-alkyl; and
or $R^{17}$ and $R^{20}$ together form an —O— group.

39. The method according to claim 38, wherein the average number of carbon atoms in all $R^9$, $R^{13}$, $R^{19}$ and $R^{21}$ radicals is from 9 to 20.

40. The method according to claim 38, wherein the monomers M1, M2, M3, M4, and M5 are present in the polymer in the following molar proportions:
M1: 0.60 to 0.97
M2: 0.02 to 0.25
M3: 0.01 to 0.15
M4: 0.002 to 0.10
M5: 0.001 to 0.02.

* * * * *